US009418286B2

(12) United States Patent  (10) Patent No.: US 9,418,286 B2
Yokono  (45) Date of Patent: Aug. 16, 2016

(54) INFORMATION PROCESSING DEVICE, INFORMATION PROCESSING METHOD, AND PROGRAM

(71) Applicant: SONY CORPORATION, Tokyo (JP)

(72) Inventor: Jun Yokono, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/525,323

(22) Filed: Oct. 28, 2014

(65) Prior Publication Data
US 2015/0178564 A1 Jun. 25, 2015

(30) Foreign Application Priority Data

Dec. 19, 2013 (JP) ................................. 2013-262010

(51) Int. Cl.
G06K 9/62 (2006.01)
G06K 9/00 (2006.01)
G06K 9/46 (2006.01)
G06F 3/042 (2006.01)

(52) U.S. Cl.
CPC .......... *G06K 9/00523* (2013.01); *G06F 3/0428* (2013.01); *G06K 9/00228* (2013.01); *G06K 9/00382* (2013.01); *G06K 9/00503* (2013.01); *G06K 9/4614* (2013.01); *G06K 9/4619* (2013.01); *G06K 9/6256* (2013.01); *G06K 9/6257* (2013.01)

(58) Field of Classification Search
USPC ........ 382/115, 116, 124, 126; 340/5.81, 5.82, 340/5.83
See application file for complete search history.

(56) References Cited

U.S. PATENT DOCUMENTS

| 5,218,529 | A  | * | 6/1993 | Meyer ...................... G06N 3/02 700/90 |
| 6,763,127 | B1 | * | 7/2004 | Lin ...................... G06K 9/00067 382/125 |
| 7,099,510 | B2 |   | 8/2006 | Jones et al. |
| 7,502,497 | B2 | * | 3/2009 | Hamid .................. G06K 9/0002 340/5.53 |
| 7,575,051 | B2 | * | 8/2009 | Stoesz ................... E21B 31/005 166/177.6 |
| 8,204,281 | B2 | * | 6/2012 | Satyan ............... G06K 9/00026 382/124 |
| 8,358,815 | B2 | * | 1/2013 | Benkley ............. G06K 9/00026 382/124 |
| 8,411,913 | B2 | * | 4/2013 | Zhang ................. G06K 9/00073 382/125 |
| 8,437,534 | B2 | * | 5/2013 | Shibuya ............. G01N 21/9501 382/149 |
| 8,675,943 | B2 | * | 3/2014 | Zheng ................... G06T 7/0081 382/131 |
| 8,694,447 | B2 | * | 4/2014 | Kobayashi .............. G06T 5/002 706/13 |
| 2002/0102034 | A1 |   | 8/2002 | Holdredge |
| 2004/0013304 | A1 |   | 1/2004 | Viola et al. |

* cited by examiner

*Primary Examiner* — Yosef Kassa
(74) *Attorney, Agent, or Firm* — Paratus Law Group, PLLC

(57) ABSTRACT

An information processing device includes a feature amount extraction unit configured to extract each feature amount from a connected image generated by connecting images photographed from different viewpoints; and a specific object recognition unit configured to perform a process of determining a position of a specific object based on the feature amount extracted by the feature amount extraction unit. The feature amount extraction unit performs a feature amount extraction process to which a separated filter in which filter-formed regions are set to be separated is applied.

13 Claims, 23 Drawing Sheets

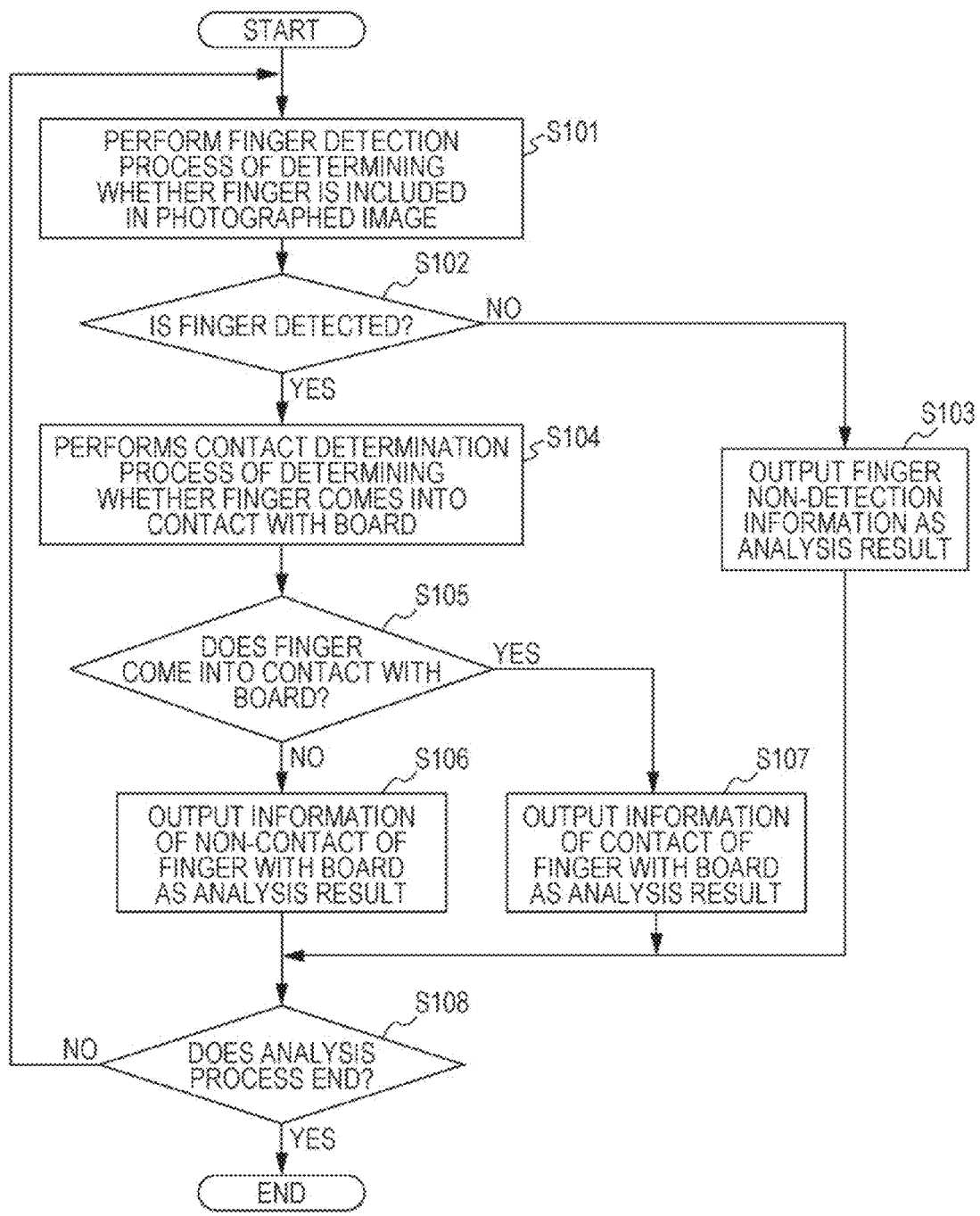

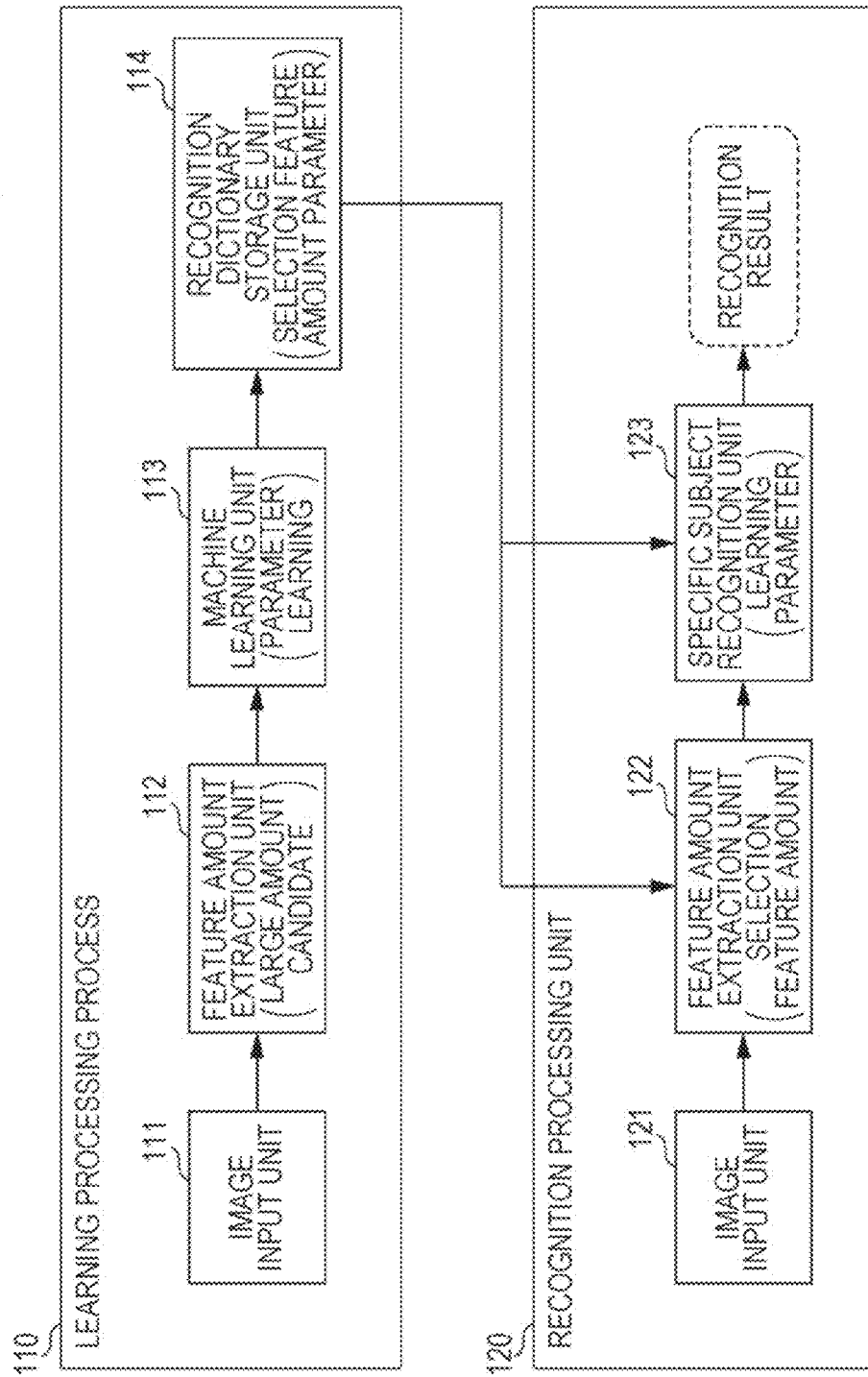

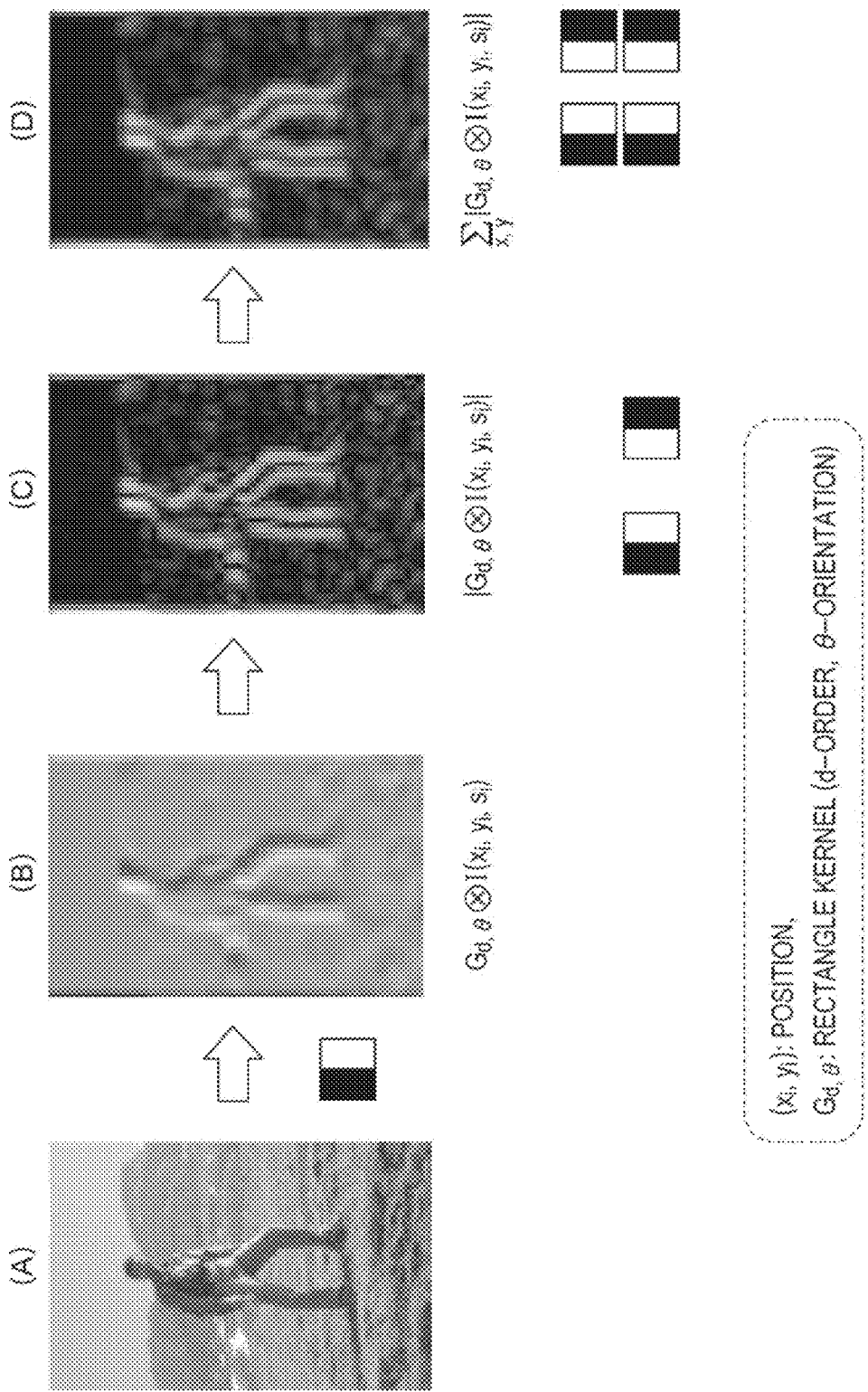

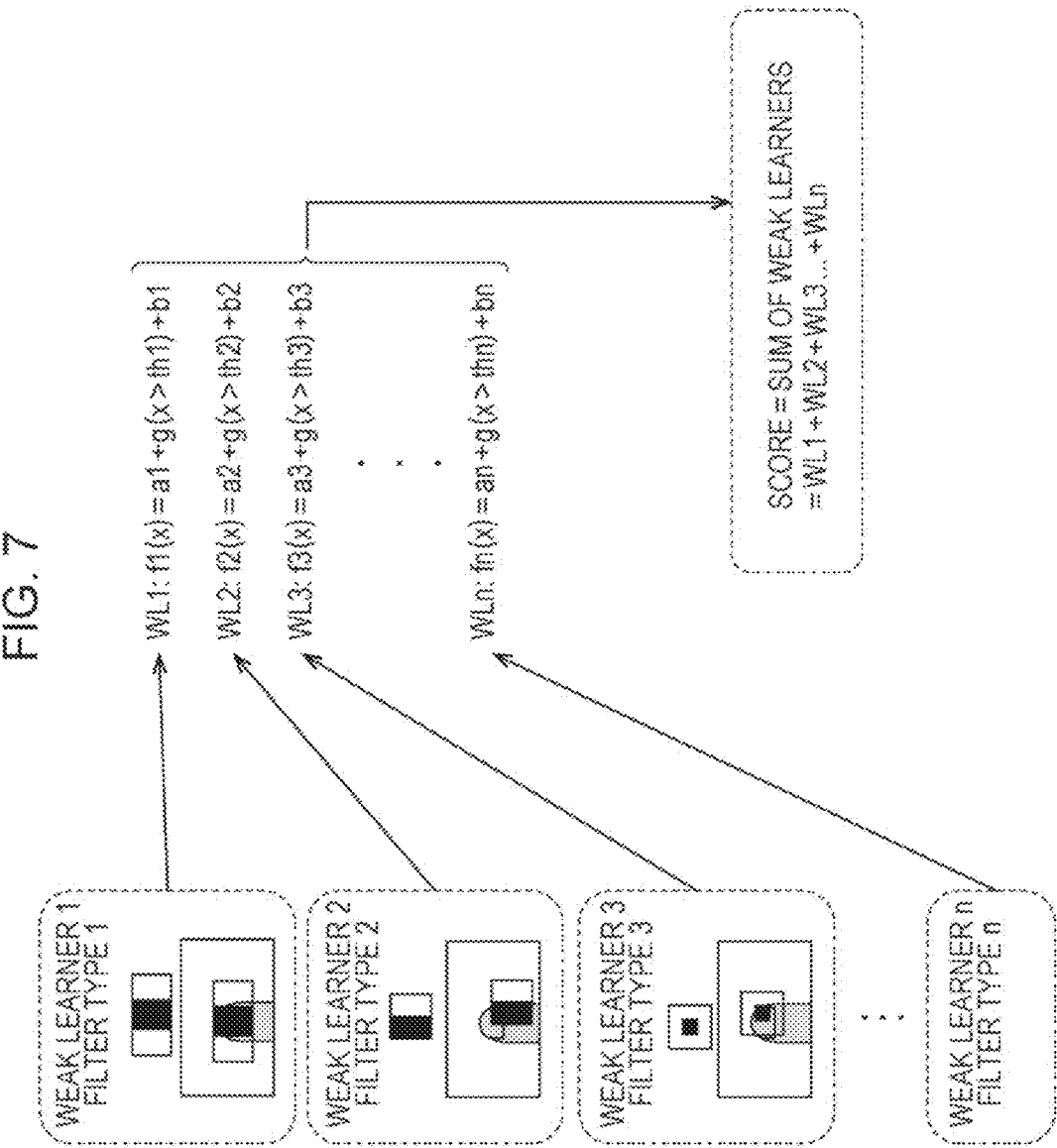

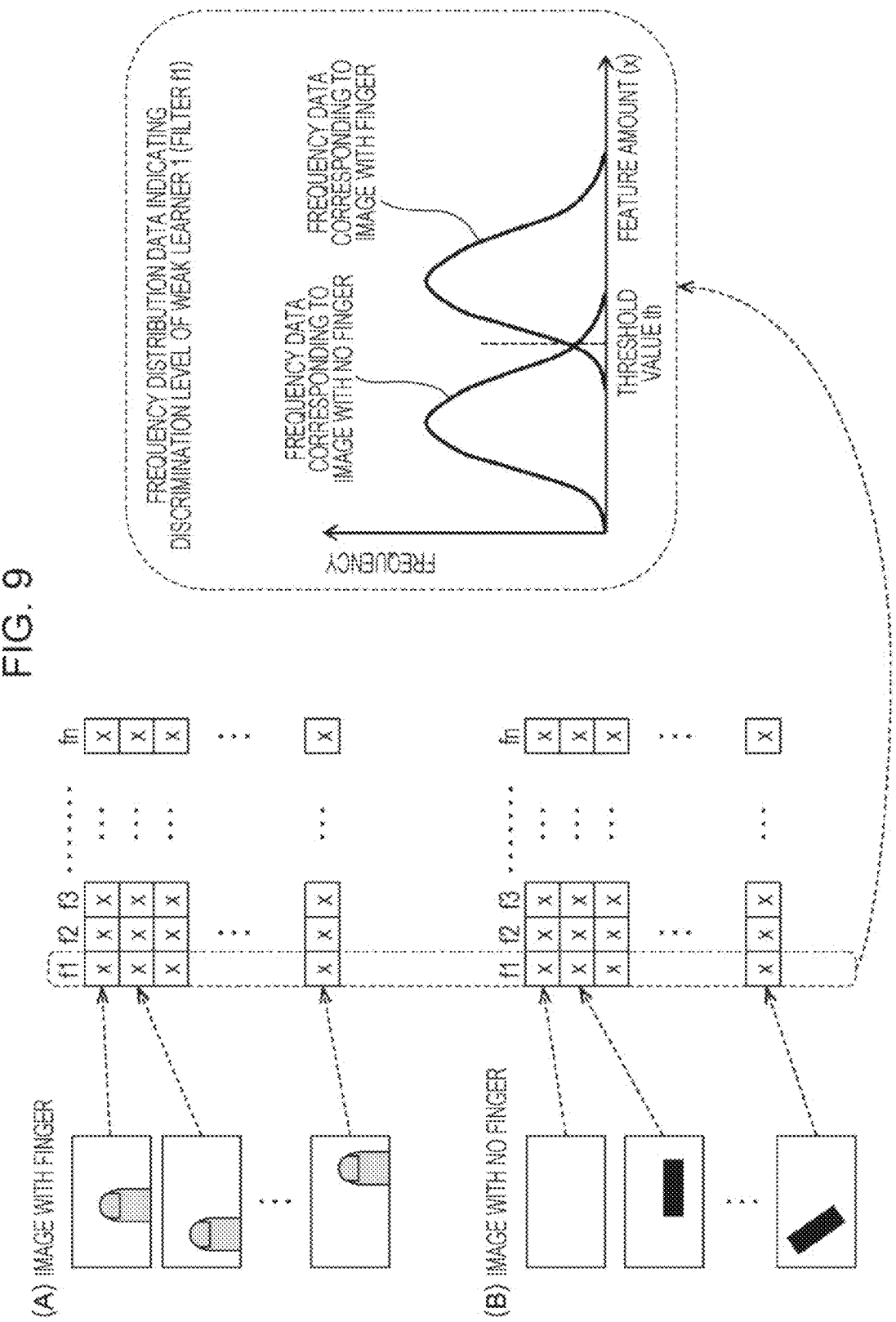

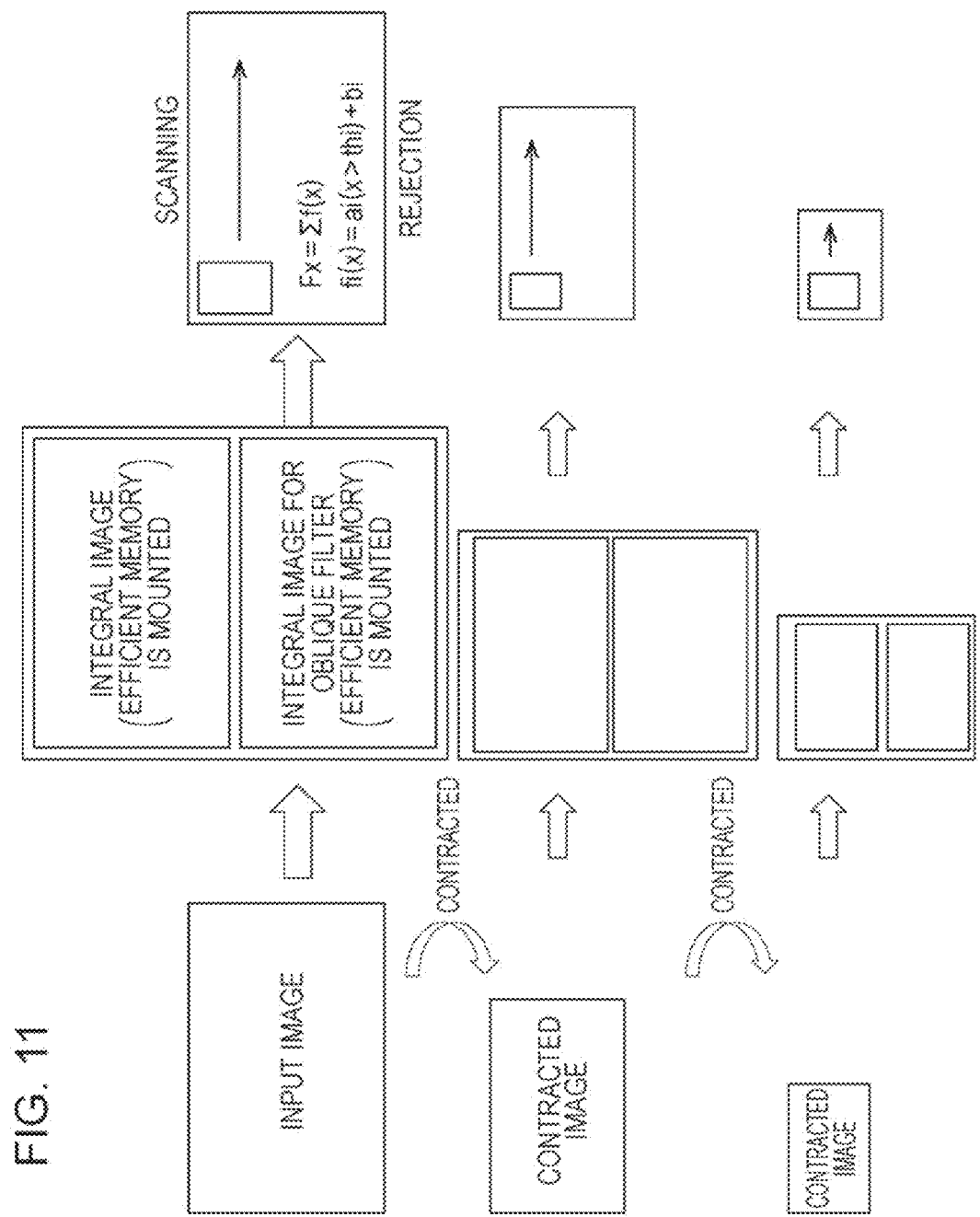

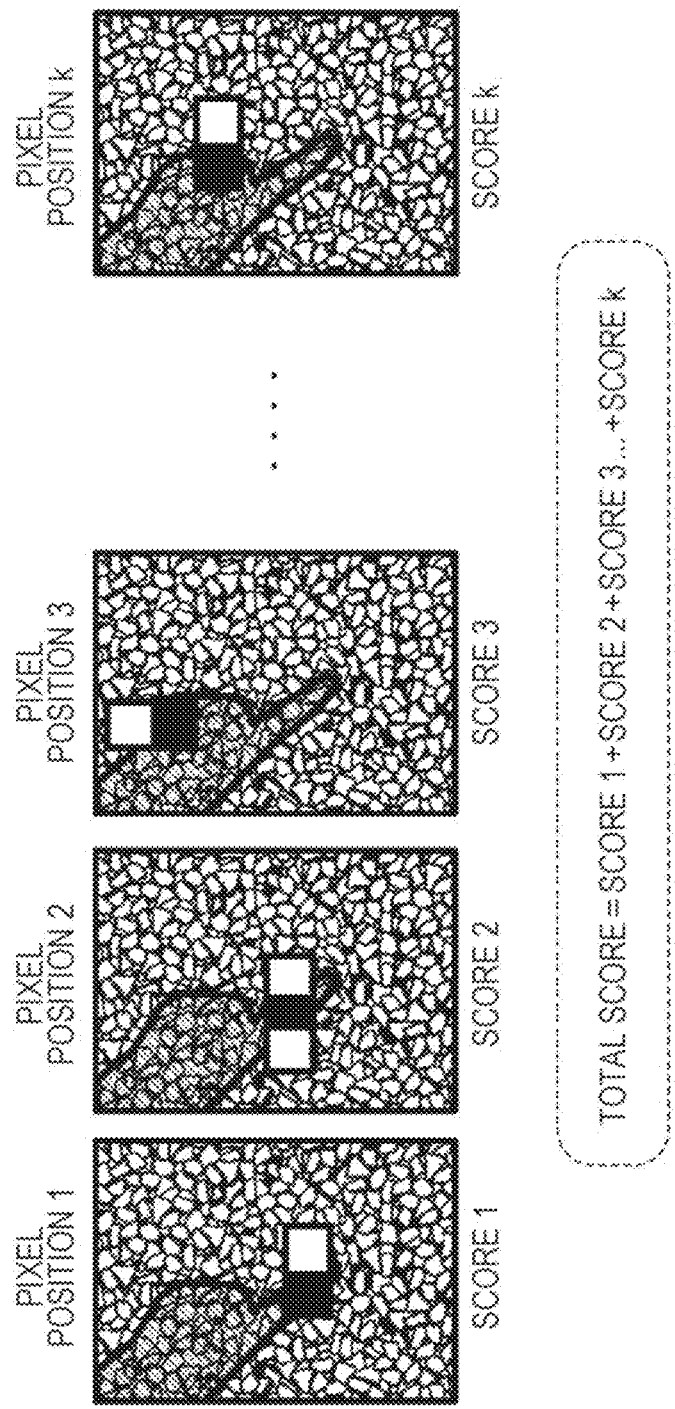

EFFICIENCY OF LEARNING PROCESS INCREASES BY LIMITING FILTER APPLICATION POSITION BY EPIPOLAR LINE CONSTRAINT.

FIG. 22

| TYPES OF FILTERS | CORRESPONDING EXAMPLES OF FILTERS AND IMAGES | MAIN IMAGE CHARACTERISTICS REFLECTED TO FEATURE AMOUNT DATA |
|---|---|---|
| (1) FILTER 1 | | FEATURE AMOUNT TO WHICH PARALLAX INFORMATION IS REFLECTED IS OBTAINED |
| (2) FILTER 2 | | FEATURE AMOUNT DATA TO WHICH SUBJECT SHAPE IS REFLECTED IS OBTAINED |
| (3) FILTER 3 | | FEATURE AMOUNT TO WHICH PARALLAX INFORMATION IS REFLECTED IS OBTAINED |
| (4) FILTER 4 | | FEATURE AMOUNT DATA TO WHICH SUBJECT SHAPE IS REFLECTED IS OBTAINED |
| (5) FILTER 5 | | FEATURE AMOUNT DATA TO WHICH SUBJECT SHAPE IS REFLECTED IS OBTAINED |

INFORMATION PROCESSING DEVICE, INFORMATION PROCESSING METHOD, AND PROGRAM

CROSS REFERENCE TO RELATED APPLICATIONS

This application claims the benefit of Japanese Priority Patent Application JP 2013-262010 filed Dec. 19, 2013, the entire contents of which are incorporated herein by reference.

BACKGROUND

The present disclosure relates to an information processing device, an information processing method, and a program, and more particularly, to an information processing device, an information processing method, and a program analyzing presence or absence or the position of a specific object based on an image photographed by a camera.

A distance analysis process is generally used which uses a stereo camera as a system analyzing the position of a subject photographed in an image.

This process is a process of analyzing corresponding points of two images photographed from two different positions and calculating a distance (depth) from a camera to a subject based on information regarding the corresponding points.

In the distance calculation process based on the corresponding points of two images, however, a calculation cost or a processing cost increases. Therefore, unless a device having a sufficient capability to process data is used, a process delay occurs in some cases.

A process using a feature amount is generally used as a process of detecting a specific object, e.g., a human face or hand, from an image. This process is a process of acquiring image data indicating a feature amount of a detection target in advance and detecting an image region similar to the feature amount in a photographed image. For example, when a human face is detected, image data indicating a feature amount of a human face is acquired in advance and an image region having the feature amount similar to the feature amount in a photographed image is determined as a face region.

As the feature amount, for example, a feature amount which can be obtained by extracting an edge in an image is used. A target object is detected by accumulating a plurality of pieces of feature amount data by a learning process performed in advance and comparing the accumulated learning data to an image region included in a photographed image (see U.S. Patent Application Publication No. 2004/0013304, U.S. Patent Application Publication No. 2002/0102034, and U.S. Pat. No. 7,099,510).

In the object detection process using the feature amount disclosed in the technologies of the related art, however, for example, a region similar to a specific feature amount can be detected in one image and an image region of a specific object can be specified, but a spatial position of the object is not determined.

SUMMARY

It is desirable to provide an information processing device, an information processing method, and a program performing, for example, a process of determining whether a specific object such as a human finger is included in an image based on an image photographed by a camera and a process of determining the position of the specific object.

According to a first embodiment of the present disclosure, there is provided an information processing device including a feature amount extraction unit configured to extract each feature amount from a connected image generated by connecting images photographed from different viewpoints; and a specific object recognition unit configured to perform a process of determining a position of a specific object based on the feature amount extracted by the feature amount extraction unit. The feature amount extraction unit performs a feature amount extraction process to which a separated filter in which filter-formed regions are set to be separated is applied.

In the information processing device according to the embodiment of the present disclosure, the feature amount extraction unit may perform the feature amount extraction process by setting the separated filter regions forming the separated filter in two images of the connected image.

In the information processing device according to the embodiment of the present disclosure, the feature amount extraction unit may extract the feature amount by selectively applying filters determined to have high discrimination in first and second states of the specific object in a learning process performed in advance.

The information processing device according to the embodiment of the present disclosure may further include a learning processing unit configured to perform a process of determining the filter with high discrimination by inputting a plurality of connected images indicating the first and second states of the specific object and extracting the feature amounts to which separated filters with different formats are applied.

In the information processing device according to the embodiment of the present disclosure, the specific object recognition unit may calculate a score by adding the feature amounts corresponding to the different separated filters and extracted by the feature amount extraction unit and perform the process of determining the position of the specific object based on the added score.

In the information processing device according to the embodiment of the present disclosure, the specific object recognition unit may calculate scores corresponding to pixels and obtained by adding the feature amounts corresponding to the pixels corresponding to the different separated filters and extracted by the feature amount extraction unit and perform the process of determining the position of the specific object based on a total score obtained by further adding the calculated scores correspond mg to the pixels.

In the information processing device according to the embodiment of the present disclosure, the feature amount extraction unit may calculate the feature amount as an index value used to distinguish a first state in which a finger, which is the specific object, comes into contact with a board from a second state in which the finger does not come into contact with the board. Based on the feature amount extracted by the feature amount extraction unit, the specific object recognition unit may perform a process of determining whether the finger which is the specific object comes into contact with the board.

In the information processing device according to the embodiment of the present disclosure, the feature amount extraction unit may further extract the feature amount as the index value used to determine whether the specific object is present in an image. Based on the feature amount extracted by the feature amount extraction unit, the specific object recognition unit may perform a specific object detection process of determining whether the specific object is present or absent.

In the information processing device according to the embodiment of the present disclosure, the separated filter may be a filter in which filter regions with different luminance are set to be separated.

In the information processing device according to the embodiment of the present disclosure, the feature amount extraction unit may extract the feature amount by setting the separated filter on an epipolar line corresponding to a feature point of one image of the connected image and the feature point on the other image of the connected image.

According to a second embodiment of the present disclosure, there is provided an information processing method performed in an information processing device. The method includes extracting, by a feature amount extraction unit, a feature amount from a connected image generated by connecting images photographed from different viewpoints; and performing, by a specific object recognition unit, a process of determining a position of a specific object based on the feature amount extracted by the feature amount extraction unit. The feature amount extraction unit performs a feature amount extraction process to which a separated filter in which filter-formed regions are set to be separated is applied.

According to a third embodiment of the present disclosure, there is provided a program causing an information processing device to perform information processing. The program causes a feature amount extraction unit to extract a feature amount from a connected image generated by connecting images photographed from different viewpoints; a specific object recognition unit to perform a process of determining a position of a specific object based on the feature amount extracted by the feature amount extraction unit; and the feature amount extraction unit to perform a feature amount extraction process to which a separated filter in which filter-formed regions are set to be separated is applied.

The program according to an embodiment of the present disclosure is a program which can be supplied to an information processing device or a computer system capable of executing various program codes by a communication medium or a storage medium supplying the program in a computer-readable format. By supplying the program in the computer-readable format, a process is realized according to the program on the information processing device or the computer system.

The other purposes, characteristics, and advantages of an embodiment of the present disclosure will be apparent from the more detailed description based on embodiments of the present disclosure to be described and the appended drawings. A system in the present specification refers to a logical collection of a plurality of devices and is not limited to a configuration in which constituent devices are present in the same casing.

According to the configuration of the embodiments of the present disclosure, a device and a method are realized in which the specific object position determination process is performed based on the feature amount extracted from the connected image of the images photographed from the different viewpoints.

Specifically, each feature amount is extracted from a connected image generated by connecting images photographed from different viewpoints and a process of determining a position of a specific object is performed based on the feature amount extracted by the feature amount extraction unit. A feature amount extraction unit performs a feature amount extraction process to which a separated filter in which filter-formed regions are set to be separated is applied and performs the feature amount extraction process by setting the separated filter regions forming the separated filter in two images of the connected image. A specific object recognition unit performs a specific object position determination process based on a score by adding the feature amounts corresponding to the different separated filters and extracted by the feature amount extraction unit.

In the configuration, the device and die method are realized in which the specific object position determination process is performed based on the feature amount extracted from the connected image of the images photographed from the different viewpoints.

The advantages described in the present specification are merely exemplary and are not limited, and additional advantages may be obtained.

BRIEF DESCRIPTION OF THE DRAWINGS

FIG. 2 is a flowchart illustrating a sequence of a process performed by the information processing device according to the embodiment of the present disclosure;

FIG. 3 is a diagram for describing the configuration and a process of the information processing device according to the embodiment of the present disclosure;

FIG. 6 is a diagram for describing a feature amount extraction process;

FIG. 7 is a diagram for describing a score calculation process;

FIG. 9 is a diagram for describing the learning process for the object detection;

FIG. 11 is a diagram for describing the feature amount extraction process;

FIG. 13 is a diagram for describing a total score calculation process;

FIG. 22 is a diagram for describing characteristics and types of separated filters.

DETAILED DESCRIPTION OF EMBODIMENTS

Hereinafter the details of an information processing device, an information processing method, and a program will be described with reference to the drawings and the description thereof will be made in the following items.

1. Overview of Process Performed by Information Processing Device According to Embodiment of the Present Disclosure
2. Configuration and Process of Information Processing Device
3. Process Performed by Each Unit Included in Information Processing Device
3-1. Process Performed by Feature Amount Extraction Unit of Learning Processing Unit
3-2. Process Performed by Machine Learning Unit
3-3. Process Performed by Recognition Processing Unit
4. Process of Determining Position of Specific Object
4-1. Process Performed by Learning Processing Unit
4-2. Process Performed by Recognition Processing Unit
5. Embodiment in Which Filter Application Position Is Limited
6. Characteristics and Type of Separated Filter
7. Example of Configuration of Information Processing Device
8. Conclusion of Configuration According to Embodiment of the Present Disclosure 1. Overview of Process Performed by Information Processing Device According to Embodiment of the Present Disclosure First, an overview of a process performed by the information processing device according to an embodiment of the present disclosure will be described with reference to FIGS. 1A and 1B and the subsequent drawings.

The information processing device according to the embodiment of the present disclosure inputs images photographed by cameras installed at a plurality of different positions and performs each of the following processes based on the images photographed by the cameras:

(a) a "specific object detection process" of determining whether a specific object is included in a photographed image; and (b) a "specific object position determination process" of determining the position of the specific object detected in the foregoing process (a).

Each of the processes (a) and (b) are performed.

The following embodiment will be described as an embodiment in which a specific object on which the detection process and the position determination process are performed is a human finger 30 illustrated in FIG. 1A.

An embodiment will be described in which the specific object position determination process is performed as a process of determining two states regarding whether the finger 30 comes into contact with (touches) a board 21.

Figure 1A:
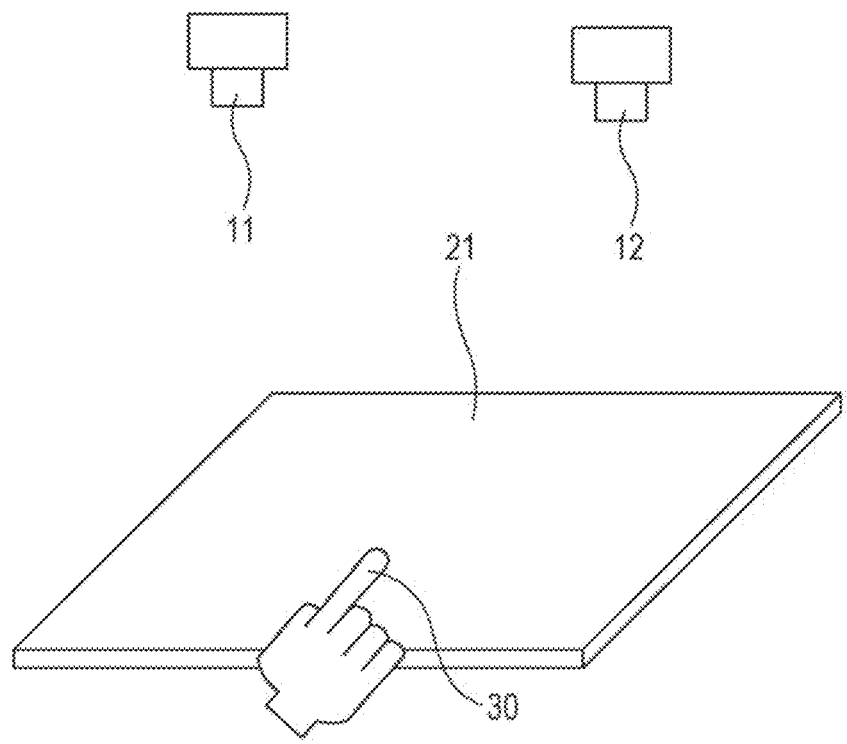
FIGS. 1A and 1B are diagrams for describing an overview of a process performed by an information processing device according to an embodiment of the present disclosure.

FIG. 1A is a diagram illustrating an example of an image photography environment.

FIG. 1A illustrates a state in which the human finger 30 is present on the board 21 and the finger 30 comes into contact with (touches) the board 21.

The finger 30 is moved frequently and does not come into contact with the board 21 in some cases or is distant from the board 21 and is not present on the board 21 in some cases.

That is, as the states of the finger 30, there are the following three kinds of states:

(state 1) a state in which the finger 30 comes into contact with board 21;

(state 2) a state in which the finger 30 is present above the board 21 and does not come into contact with the board 21; and (state 3) a state in which the finger 30 does not come into contact with the board 21 and is not present above the board 21.

Figure 1B:
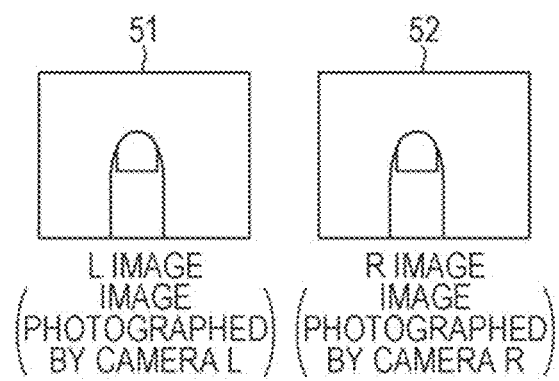

The information processing device according to an embodiment, of the present disclosure determines the foregoing three states based on images photographed by two cameras illustrated in FIGS. 1A and 1B, i.e., a camera L11 and a camera R12.

The camera L11 is fixed at a position on the upper left side when viewed from the center of the board 21 and photographs a plane of the board 21 from the upper left side.

On the other hand, the camera R12 is fixed at a position on the upper right side when viewed from the center of the board 21 and photographs the plane of the board 21 from the upper right side.

When the finger 30 is present above the board 21, an image including the finger 30 is photographed from each of the upper left side and the upper right side.

An example of the image photographed by each camera is illustrated in FIG. 1B.

An L image 51 is an image photographed by the camera L11.

An R image 52 is an image photographed by the camera R12.

The examples of the images are the photographed images in the state in which the finger 30 comes into contact with the board 21.

When the finger 30 does not come into contact with the board 21 or the finger 30 is not present above the board 21, images different from the images illustrated in FIG. 1B are photographed.

The images photographed by the camera L11 and the camera L12 may be still images or moving images. When the images are still images, the state of the finger 30 is determined among the foregoing (state 1) to (state 3) using the two photographed still images.

When the photographed images are moving images, the state of the finger 30 is determined among the foregoing (state 1) to (state 3), for example, in photography frame units or predefined predetermined frame intervals.

Next, a process sequence performed by the information processing device according to an embodiment of the present disclosure will be described with reference to the flowchart illustrated in FIG. 2.

The information processing device according to an embodiment of the present disclosure inputs, for example, the images photographed by the camera L11 and the camera R12 set at two different positions illustrated in FIGS. 1A and 1F and performs a process of determining a state of the finger 30 among the above-described states, i.e., the following three states based on these images:

(state 1) a state in which the finger 30 comes into contact with board 21;

(state 2) a state in which the finger 30 is present above the board 21 and does not come into contact with the board 21; and.

(state 3) a state in which the finger 30 does not come into contact with and is not present above the board 21.

The process of each step of the flow illustrated in FIG. 2 will be described.

Step S101

First, the information processing device performs a finger detection process of determining whether the finger is included in the photographed image. This process is performed using only one image between the L image 51 and the R image 52 illustrated in FIG. 1B.

In the finger detection process, learning data indicating feature amounts accumulated in advance is used. A specific example of this process will be described later.

Steps S102 and S103

In step S102, the information processing device determines whether the finger is detected from the photographed image.

When the finger is not detected, the process proceeds to step S103. An analysis result indicating that the finger is not detected is output, and the process proceeds to step S108.

An output destination of the analysis result is a data processing unit that performs a process according to the analysis result, and may be a data processing unit in the information processing device or may be an external device connected to the information processing device.

Step S104

When it is determined in step S102 that the finger is detected in the photographed image, the process proceeds to step S101.

In step S104, a contact determination process is performed as a finger position detection process to determine whether the finger comes into contact with (touches) the board.

In the contact determination process, the L image 51 and the R image 52 illustrated in FIG. 1F, i.e., the plurality of images photographed from different viewpoints, are used.

In the contact determination process, the learning data indicating feature amounts accumulated in advance is also used. A specific example of this process will be described later.

Steps S105 to S107

In step S105, the information processing device determines whether the finger detected from the photographed image comes into contact with the board. When it is determined that the finger does not come into contact with the board, the process proceeds to step S106. An analysis result indicating that the finger does not come into contact with the board is output and the process proceeds to step S108.

Conversely, when it is determined that the finger comes into contact with the board, the process proceeds to step S107. An analysis result indicating that the finger comes into contact with the board is output and the process proceeds to step S108.

An output destination of the analysis result is a data processing unit that performs a process according to the analysis result, and may be a data processing unit in the information processing device or may be an external device connected to the information processing device.

Step S108

Next, in step S108, the information processing device determines whether the analysis process ends. When an image to be analyzed is not input, it is determined that the process ends. For example, when the analysis is continuously performed at predefined frame intervals while photographing a moving image, the process according to the flow illustrated in FIG. 2 is performed repeatedly at predetermined frame intervals. In this case, the determination of step S108 is NO, and thus the process returns to step S101 and the analysis process of step S101 and the subsequent steps is repeatedly performed on a new input image.

In this way, the information processing device according to an embodiment of the present disclosure performs the object detection process based on one photographed image, applies an image photographed continuously from a different viewpoint, and performs the object position determination process.

In the embodiment described herein, the object detection process is performed as a finger detection process and the object position determination process is performed as a process of determining two states regarding whether the finger comes into contact with the board.

2. Configuration and Process of Information Processing Device

Next, an example of the configuration of she information processing device according to an embodiment of the present disclosure will be described.

The example of the configuration of the information processing device, according to an embodiment of the present disclosure is illustrated in FIG. 3. An information processing device 100 includes a learning processing unit 110 and a recognition processing unit 120.

The learning processing unit 110 includes an image input unit 111, a feature amount extraction unit 112, a machine learning unit 113, and a recognition dictionary storage unit 114.

The learning processing unit 110 inputs a plurality of images as learning images and the recognize processing unit 120 generates a recognition dictionary used in a process of discriminating presence or absence of a specific object or the position of the specific object from the image based on the learning images. The generated recognition dictionary is stored in the recognition dictionary storage unit 114.

On the other hand, the recognition processing unit 120 includes an image input unit 121, a feature amount extraction unit 122, and a specific object recognition unit 123.

The recognition processing unit 120 inputs an analysis target image and performs a process of detecting a specific object and determining the position of the specific object. The recognition processing unit 120 performs the process of detecting the specific object and determining the position of the specific object using the recognition dictionary generated based on the learning data by the learning processing unit 110 and stored in the recognition dictionary storage unit 114.

The process according to the flowchart described with reference to FIG. 2 corresponds to the process performed by the recognition processing unit 120.

The information processing device 100 illustrated in FIG. 3 performs the following two processes, as described above with reference to the flow illustrated in FIG. 2.

(process 1) an object detection process of determining whether a finger is included in an image; and (process 2) an object position determination process (contact determination process) of determining whether the detected finger comes into contact with the board.

The learning processing unit 110 of the information processing device 100 generates recognition dictionaries as learning data applied to the foregoing (process 1) and (process 2).

The recognition processing unit 120 performs each of the following process by individually applying the recognition dictionaries corresponding to the foregoing (process 1) and (process 2) generated by the learning processing unit, i.e.:

(process 1) the object detection process of determining whether a finger is included in an image; and (process 2) the object position determination process (contact determination process) of determining whether the detected finger comes into contact with the board.

3. Process Performed by Each Unit Included in Information Processing Device

Hereinafter, the processes performed by the processing units of the information processing device 100 illustrated in FIG. 3 will be described in sequence.

3-1. Process Performed by Feature Amount Extraction Unit of Learning Processing Unit First, a process performed by the feature amount extraction unit 112 in the learning processing unit 110 of the information processing device 100 illustrated in FIG. 3 will be described.

The learning processing unit 110 inputs the plurality of photographed images as learning images from the image input unit 111.

The learning images are, for example, a plurality of images photographed in the photography environment, described with reference to FIG. 1A. The learning images include a plurality of images in the following states:

(state 1) the state in which the finger 30 comes into contact with the board 21;

(state 2) the state in which the finger 30 is present above the board 21 and does not come into contact with the board 21; and (state 3) the state in which the finger 30 does not come into contact with and is not present above the board 21.

In each of the learning images input in the learning process, attribute information (a label, a tag, or the like) indicating in which state each image is among the foregoing states is set.

The feature amount extraction unit 112 extracts a feature amount included in the learning image input from the image input unit 111. In the feature amount extraction, various filters are used. Examples of rectangular filters applied to the feature amount extraction are illustrated in FIGS. 4A to 5B.

Figure 4A:
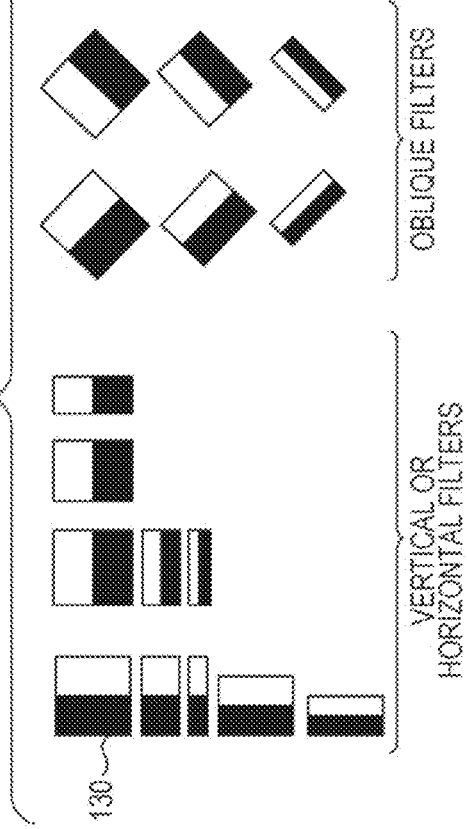
FIGS. 4A and 4B are diagrams for describing a filter applied to feature amount extraction.

First differential filters illustrated in FIG. 4A are filters appropriate for a process of extracting a pixel region that has a feature in which a change direction is from white to black or from black to white in an image from an input image.

Vertical or horizontal direction filters can efficiently extract a pixel region when the change direction from white to black or from black to white is a vertical or horizontal direction. Oblique direction filters can efficiently extract a pixel region when the change direction from white to black or from black to white is an oblique direction.

Figure 4B:
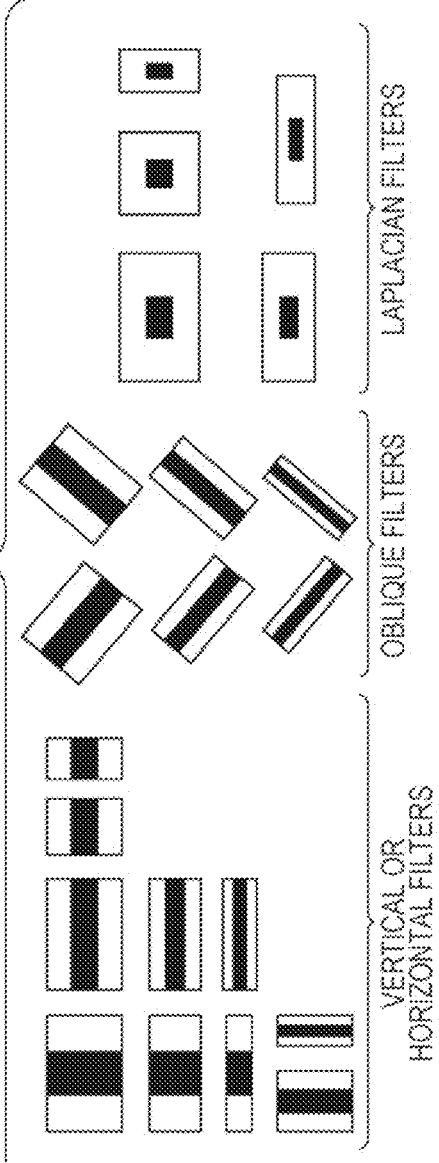

Second differential filters illustrated in FIG. 4B are filters appropriate for a process of extracting a pixel region having a feature in which a change direction is white/black/white or black/white/black in an image from an input image.

Vertical or horizontal direction filters can efficiently extract a pixel region when the change direction is a vertical or horizontal direction. The oblique direction filters can efficiently extract a pixel region when the change direction is an oblique direction.

Figure 5A:
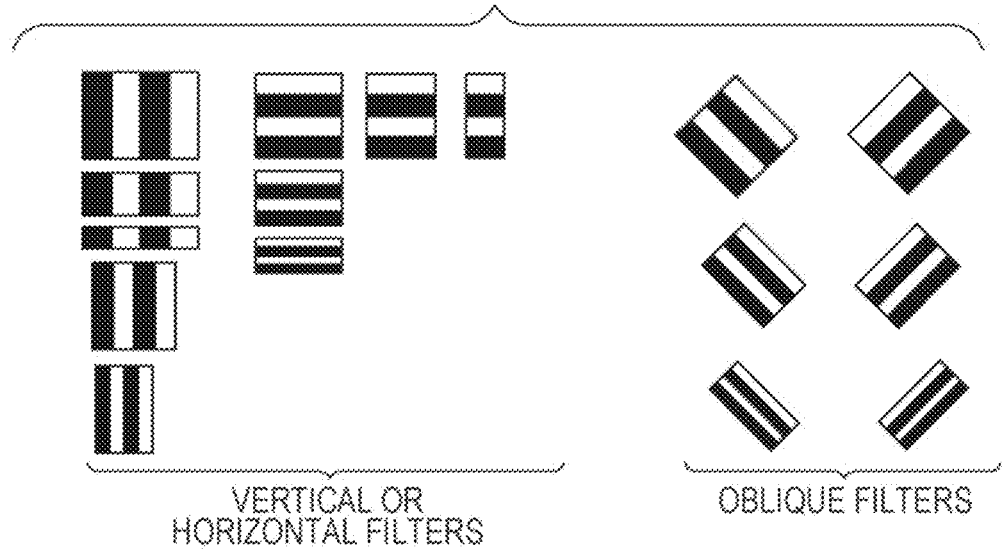
FIGS. 5A and 5B are diagrams for describing a filter applied to the feature amount extraction.

Third differential filters illustrated in FIG. 5A are filters appropriate for a process of extracting a pixel region having a feature in which a change direction is white/black/white/black or black/white/black/white in an image from an input image.

Vertical or horizontal direction filters can efficiently extract a pixel region when the change direction is a vertical or horizontal direction. The oblique direction filters can efficiently extract a pixel region when the change direction is an oblique direction.

The rectangular filters illustrated in FIGS. 4A, 4B, and 5A are known filters that are used to extract a feature amount in the related art.

Figure 5B:
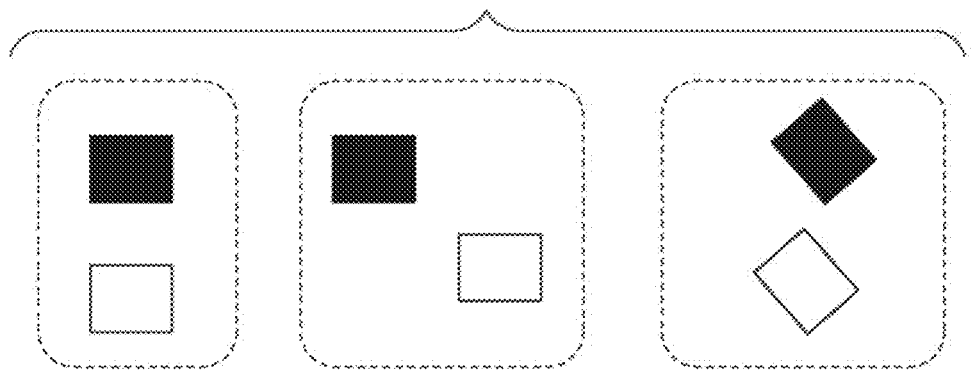

Separated filters illustrated in FIG. 5B are filters that are not known filters, but are devised as filters used for the object position determination process performed by the information processing device according to an embodiment of the present disclosure.

The separated filters are filters that are used to determine the position of the finger 30 illustrated in FIGS. 1A and 1B, specifically, to determine whether the finger 30 comes into contact with the board 21.

The separated filters illustrated in FIG. 5B have a feature in which white and black patterns are set to be separate. This feature is different from that of the first to third differential filters illustrated in FIGS. 4A, 4B, and 5A.

A finger position determination process to which the separated filters illustrated in FIG. 5B are applied will be described in detail later.

An example of feature amount extraction to which the filters are applied and which are performed by the feature amount extraction unit 112 in the learning processing unit 110 of the information processing device 100 illustrated in FIG. 3 will be described with reference to FIG. 6.

FIG. 6 is a diagram for describing an example of a process of extracting a pixel region having the same change region from images by applying a filter 130 which is shown in the upper left end of the first differential filters illustrated in FIG. 4A and in which the change direction is the horizontal direction from black to white.

Part (A) of FIG. 6 illustrates an input image. Here, the input image is a learning image.

Part (B) of FIG. 6 illustrates an image which can be obtained by performing filter calculation to which the filter 130 is applied which is shown in the upper left end of the first differential filters illustrated in FIG. 4A and in which the change direction is the horizontal direction from black to white.

The filter calculation is performed according to an expression below, as illustrated.

$$G_{d,\theta}(x) \, I(x_i, y_i, s_i) \quad \text{(Expression 1)}$$

In (Expression 1) above, $G_{d,\theta}$ is a d-th differential function of a Gauss function G corresponding to each filter described with reference to FIGS. 4A to 5B. Here, d corresponds to an order described with reference to FIGS. 4A to 5B and θ corresponds to the angle of the filter, i.e., a set angle of the filter at a vertical or horizontal angle (0° or 90°), an oblique angle (45° or 135°), or the like described with reference to FIGS. 4A to 5B.

Further, $(x_i, y_i)$ in $I(x_i, y_i, s_i)$ indicates the position of a pixel, $s_i$ means the scale of an image, and i is a scale discriminator of an image to be applied.

$I(x_i, y_i, s_i)$ presents a pixel value at the pixel position $(x_i, y_i)$ of an image with the scale $s_i$, e.g., luminance.

(Expression 1) above is an expression by which convolution calculation of the filter defined by $G_{d,\theta}$ and each pixel of the image is performed.

The example illustrated in FIG. 6 is an execution example of filter calculation to which the filter 130, which is shown in the upper left end of the first differential filters illustrated in FIG. 4A and in which the change direction is the horizontal direction from black to white, is applied.

Through the filter calculation, the pixel value of the input image illustrated in part (A) of FIG. 6 is converted into an image illustrated in part (B) of FIG. 6.

Part (C) of FIG. 6 illustrates an image obtained, by performing a calculation process of equalizing a pattern changed from black to white and a pattern conversely changed from white to black in the right direction corresponding to the filter 130 illustrated in FIG. 4A. Through this process, extraction of a feature pattern which is not changed for, for example, background luminance is realized.

The filter calculation applied to the generation of the image is a calculation expressed by an expression below.

$$|G_{d,\theta} \otimes I(x_i,y_i,s_i)| \qquad \text{(Expression 2)}$$

(Expression 2) above corresponds to a process of calculating the absolute value of (Expression 1) described above.

Part (D) of FIG. 6 illustrates an image subjected to a process of smoothing a result obtained by (Expression 2) above in a pixel region of a predetermined range of the image illustrated in part (C) of FIG. 6 in order to improve resistance to deviation or the like of a pixel position.

The filter calculation applied to the generation of the image is a calculation expressed by an expression below.

$$\sum_{x,y} |G_{d,\theta} \otimes I(x_i, y_i, s_i)| \qquad \text{(Expression 3)}$$

For example, a value which can be obtained by (Expression 3) above is a feature amount (x) obtained based on a filter defined by $G_{d,\theta}$.

The example illustrated in FIG. 6 is an example of a feature amount calculation process to which the filter 130, which is shown in the upper left end of the first differential filters illustrated in FIG. 4A and in which the change direction is the horizontal direction from black to white, is applied. The value of the feature amount (x) increases in a pixel region similar to the pattern of the filter 130.

The feature amount (x) is calculated as a value corresponding to each pixel.

The same process is also performed on the other filters, the feature amount (x) corresponding to each filter is extracted, and the extraction result is output to the machine learning unit 113 illustrated in FIG. 3.

3-2. Process Performed by Machine Learning Unit

Next, a process performed by the machine learning unit 113 in the learning processing unit 110 of the information processing device 100 illustrated in FIG. 3 will be described.

Each of the filters illustrated, in FIGS. 4A to 5B becomes a weak learner (WL). The weak learner determines whether an object is detected based on rectangular characteristics obtained by superimposing she filter on a search region, e.g., whether a difference (feature amount x) between a sum of the luminance values in a region corresponding to a black rectangle and a sum of the luminance values in a region corresponding to a white rectangle is greater than a threshold value (th).

In the process according to an embodiment of the present disclosure, position determination (contact determination) of determining whether a finger comes into contact with a board is also performed as a specific object (finger) detection process and a specific object (finger) position determination process.

In the object detection process, whether the specific object is detected is determined based on whether the feature amount (x) obtained through the filter application is greater than the threshold value.

In the object position determination process (contact determination process), whether the object (finger) comes into contact with the board is determined based on whether the feature amount (a) obtained through the filter application is greater than the threshold value.

In the application of the rectangular filters of the black and white patterns illustrated in FIGS. 4A to 5B, a finger region can be determined from an input image at a certain probability based on the rectangular characteristics, for example, using the learning result that the luminance value of the finger region is lower than that of the background.

A sufficient discriminative capability may not be obtained by only an individual weak learner, but a learner having stronger discrimination can be constructed by linearly combining the discrimination results of a plurality of weak learners.

One of the processes performed by the machine learning unit 113 is to generate a stronger learner by integrating the feature amount extraction results obtained by the weak learners corresponding to the filters and to generate selection information (score) of a feature amount optimum for detection or position determination of the specific object (finger) in the recognition processing unit 120.

This process will be described with reference to FIG. 7

An example of a process when the object detection process of determining whether the finger is included in an image is performed will be described with reference to FIG. 7 and the subsequent drawings. The position determination process of determining whether the finger comes into contact with the board will be described later.

FIG. 7 is a diagram for describing an example of a process performed by setting the filters as weak learners to n, setting functions f1(x) to fn(x) outputting determination results regarding whether a detection target (for example, a finger) is included in each image region based on the feature amounts (x) obtained by the weak learners 1 to n corresponding to the filters, and calculating a score based on the determination results obtained by the plurality of weak learners.

The function m1(x) outputting the determination results regarding whether the detection target (for example, a finger) is included in each image region based on the feature amounts (x) obtained by the weak learners 1 to it corresponding to the filters is expressed by an expression (Expression 4) below:

$$fn(x)=an \times g(x>thn)+bn \qquad \text{(Expression 4).}$$

In Expression (4), an and bn are coefficients (parameters) Further, g (x>thn) is a function of outputting a numeral value "1" indicating that a predetermined region is the detection target when the feature amount x is greater than the threshold value thn and is a function of outputting a numeral value "0" indicating that the predetermined region is not the detection target when the feature amount x is equal to or less than the threshold value thn.

Here, n is a filter discriminator.

When a value calculated by (Expression 4) above is "fn(x)=an+bn," the predetermined region is determined to be the detection target. When a value calculated by (Expression 4) above is "fn (x)=bn," the predetermined region is determined not to be the detection target.

An added value of the determination results fn(x) of the weak learners is assumed to be a score F(x).

The score F(x) is expressed by, for example, the following expression (Expression 5)

$$F(x)=\Sigma fn(x) \qquad \text{(Expression 5).}$$

That is, the score F(x) is a sum of the determination results fi (x) to fn(x) of N weak learners. When the value of the score F (x) is greater than a predetermined threshold value th, a detection target is considered to be present in an image. When the output value of the score F(x) is equal to or less than the predetermined threshold value th, a detection target is considered not to be present in an image.

The machine learning unit 113 performs, for example, a process of selecting the weak learner with high discrimination by inputting images classified into the following two kinds of categories as a plurality of pieces of learning image data, outputting the determination results to which the filters 1 to n described with reference to FIGS. 4A to 5B is applied, and performing statistical learning based on the output results:

an image including the finger; and
an image including no finger.

These processes will be described with reference to FIG. 8.

Figure 8:
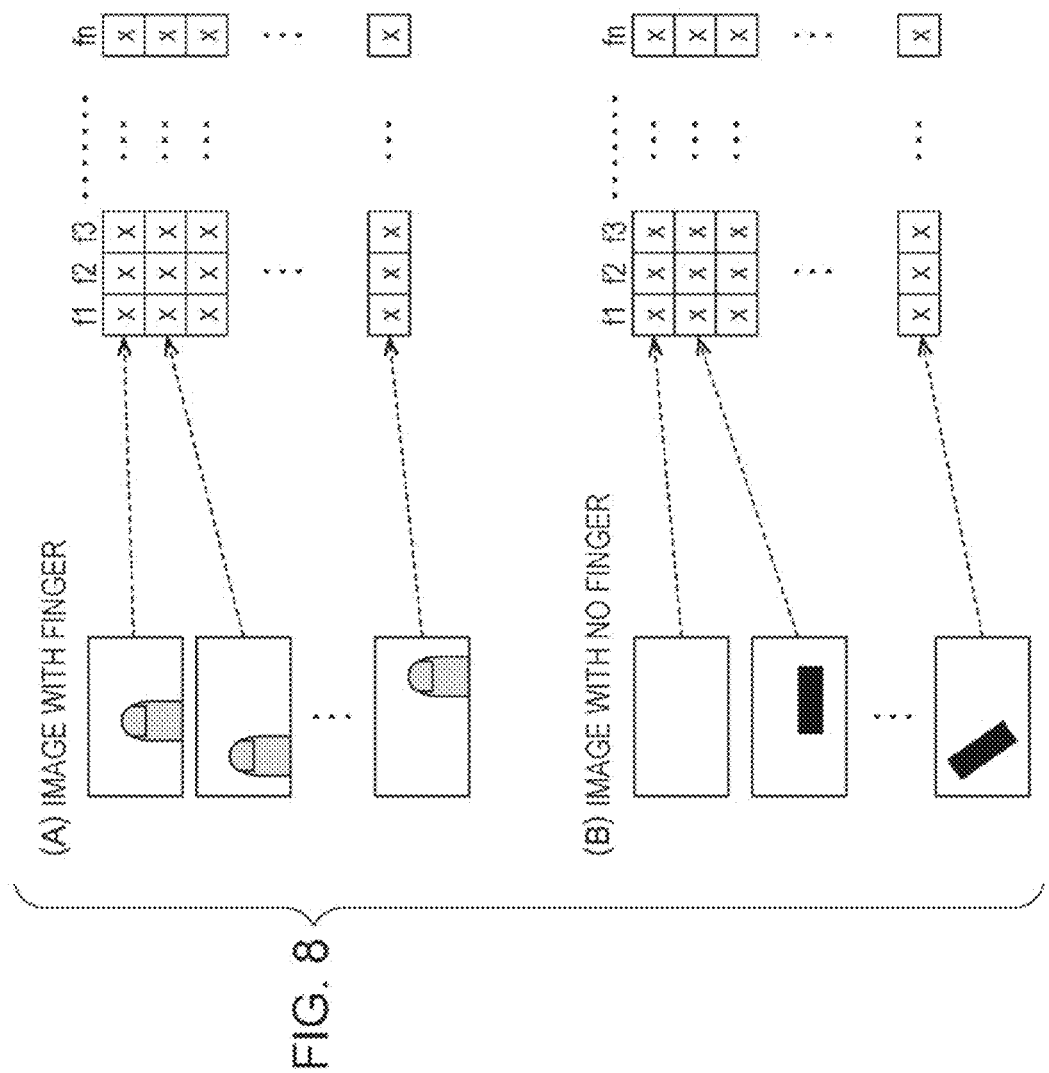
FIG. 8 is a diagram for describing a learning process for object detection.

In FIG. 8, as examples of the learning images, the following images are illustrated:

Part (A) a "finger presence image" in which a finger which is a discrimination target object is included in a photographed image; and Part (B) a "finger absence image" in which a finger which is a discrimination target object is not included in a photographed image.

These learning images are images in which attribute information (a label, a tag, or the like) indicating which image is present between the foregoing (A) and (B) is set.

For each of these images, the feature amount (x) obtained by applying the filters f1 to fn (=the weak learners 1 to n) described with reference to FIGS. 4A to 5B is calculated. Each x of one rectangle illustrated in FIG. 8 indicates the feature amount x corresponding to a certain pixel of one image to which one filter is applied.

In the object detection process, the first to third differential filters illustrated in FIGS. 4A, 4B, and FIG. 5A are used.

In the object position determination process, the separated filters described in FIG. 5B are used.

The value of the feature amount x calculated through a filter applying process is a value that differs according to the discrimination of the filters f1 to fn(=the weak learners 1 to n). When the discrimination is high, a difference between the finger presence image and the finger absence image increases.

FIG. 9 illustrates corresponding data of the feature amount (x) and a frequency when the filter f1 is applied to each learning image.

As shown in the frequency distribution data, when there is discrimination to some extent, different mounts are formed between a frequency distribution of finger presence image data and a frequency distribution of finger absence image data However, the distributions become different according to the filters to be applied.

Figure 10A:
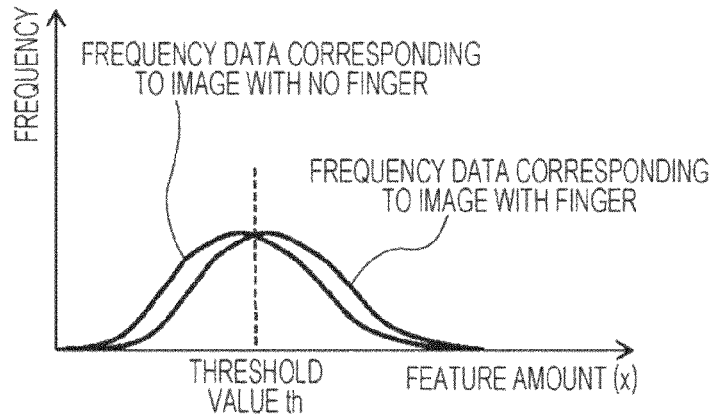
FIGS. 10A to 10C are diagrams for describing the learning process for the object detection.

FIG. 10A illustrates an example of frequency distribution data based on the weak learner (filter) with low discrimination.

Figure 10B:
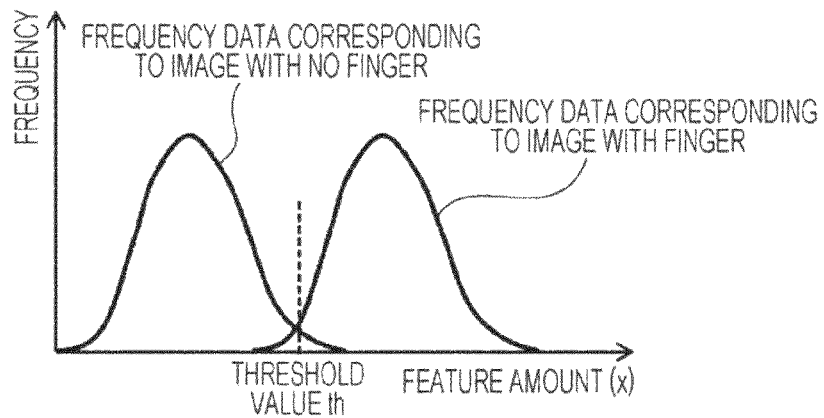

FIG. 10B illustrates an example of frequency distribution data based on the weak learner (filter) with high discrimination.

Thus, when the weak learner (filter) with low discrimination is applied, it is difficult to distinguish the finger presence image from the finger absence image. When the weak learner (filter) with high discrimination is applied, in is easy to distinguish the finger presence image from the finger absence image.

A discrimination process with high reliability is realized by performing the processes of selecting only the weak learners (filters) with high discrimination based on the frequency distribution data and calculating the score described with reference to FIG. 7 from only the selected filters.

Figure 10C:
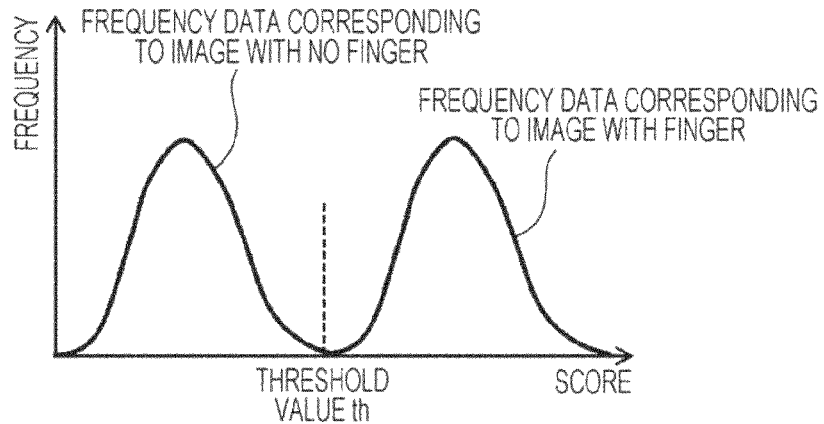

FIG. 10C illustrates an example of frequency distribution data of the score calculated from only the selected plurality of weak learners (filters) with high discrimination.

The threshold value of the score is decided by learning using, for example, a boosting or support vector and a statistical leaner such as a machine (support vector machine (SVM)).

The machine learning unit 113 performs such statistical learning to select the filters with the high discrimination.

Even for the parameters an, bn, and thn used in the function fn1(x) outputting the determination result by each filter (weak learner) described above with reference to FIG. 7, i.e., the following expression, an optimum value used to set a high discrimination level, is calculated by the statistical learning:

$$fn(x)=an \times g(x>thn)+bn.$$

A recognition dictionary is generated by setting the parameters calculated through the learning process and data (tag) indicating the highness and lowness of the discrimination in each filter (weak learner), and then is stored in the recognition dictionary storage unit 114.

3-3. Process Performed by Recognition. Processing Unit

Next, a process performed by the recognition processing unit 120 of the information processing device 100 illustrated in FIG. 3 will be described.

A specific object detection process of determining whether the finger is included in an image will be first described.

A position determination process of determining whether the finger comes into contact with the board will be described later.

The recognition processing unit 120 includes the image input unit 121, the feature amount extraction unit 122, and the specific object recognition unit 123.

The recognition processing unit 120 inputs an analysis target image and performs a process of detecting a specific object and determining the position of the specific object. The recognition processing unit 120 performs the process of detecting the specific object and determining the position of the specific object using the recognition dictionary generated based on the learning data by the learning processing unit 110 and stored in the recognition dictionary storage unit 114.

The process according to the flowchart described with reference to FIG. 2 corresponds to the process performed by the recognition processing unit 120.

The image input unit 121 of the recognize processing unit 120 inputs analysis target images That is, the analysis target images are an image photographed by the camera L11 and an image photographed by the camera R12 in the photography environment illustrated in FIG. 1A.

Unlike the learning image, the analysis target image is an image for which it is unclear whether the finger is included in the photographed image.

As described above with reference to FIG. 2, only one of the L image and the R image is used in the finger detection process of detecting whether there is the finger, and two images of the R image and the R image are used in the process of determining whether the finger comes into contact with the board.

The feature amount extraction unit 122 performs the feature amount extraction process to which the filters described with reference to FIGS. 4A to 5B are applied, as in the feature amount extraction performed by the feature amount extraction unit 112 of the learning processing unit 110 described above.

However, as the filter (weak learner) to be applied to the feature amount extraction unit 122 of the recognition processing unit 120, only the filter determined to have the high discrimination according to the learning result of the learning processing unit 110 is selected to perform the process.

The filters are selected based on filter information (tag) stored in the recognition dictionary storage unit 114.

Even for the parameters an, bn, and thn in the calculation expression of the feature amount (x) calculated using each filter (weak learner), i.e., the following expression, the values decided through the learning process of the learning processing unit 110 described above and stored in the recognition dictionary storage unit 114 are used:

$$fn(x) = an \times g(x > thn) + bn.$$

The recognition processing unit 120 calculates the feature amount using the selected filter with the high discrimination, calculates the score, and performs the finger detection process and the process of determining whether the finger comes into contact with the board based on the value of the score.

Hereinafter, a process performed by the recognition processing unit 120 will be described with reference to the drawing.

FIG. 11 is a diagram schematically illustrating an order of an image searching process of the recognition processing unit 120.

First, an integral image is generated as an intermediate image from an input image.

The filter applying process described with reference to FIG. 6 may be performed directly on the input image. However, by generating the integral image based on the input image as the intermediate image and applying the filter to the integral image, a high-speed process can be performed.

Further, the process of generating the integral, image and the high-speed process of calculating the feature amount using the integral image are disclosed in Japanese Unexamined Patent Application Publication No. 2011-180792 which is the previous application of the applicant. In the process according to an embodiment of the present disclosure, according to the same process order described in this document, the integral image is generated and the feature amount is calculated by applying then integral image.

For vertical and horizontal rectangular filters and oblique direction rectangular filters, a method of generating the integral image differs. The feature amount extraction unit 122 of the recognition processing unit 120 generates two types of integral images for the vertical and horizontal rectangular filters and the oblique direction rectangular filters corresponding to the filters described with reference to FIGS. 4A to 4B.

The feature amount extraction unit 122 of the recognition processing unit 120 calculates the feature amount using the integral image generated from the input image and applying each filter on the integral image. That is, the process of calculating the feature amount (x) described above with reference to FIG. 6 is performed. Specifically, the integral image is scanned and the feature amount (x) is calculated at each scanned position (x, y) by applying the above-described expressions, (Expression 1) to (Expression 3).

Here, the filter to be applied is the selected filter (weak learner) having the high discrimination level.

The specific object recognition unit 123 calculates the score by adding the feature amounts obtained by applying the plurality of selected filters (weak learners). This process is the process described above with reference to FIG. 7.

By using the integral image, rectangular characteristics can be calculated at high speed at each scanned position.

When the detection score reaches a value equal to or greater than a preset threshold value, a target object, i.e., the finger in the embodiment, is determined to be detected at the scanned position (x, y).

Depending on the maximum detected score obtained by scanning the image, the detection result can be negative (rejection), i.e., the result that the target object (finger) is not detected can be returned in some cases. Further, the generation of the integral image and the calculation of the detected score may be configured to be repeated while changing scale conversion, i.e., the size of the input image.

When the scale conversion is performed on the initially calculated integral image, a window with any size can be searched for. However, when the scale conversion is performed on the integral image, a calculation amount increases and the advantage of speeding up the process using the integral image is cancelled. Accordingly, in the example illustrated in FIG. 11, the integral image is recalculated when the scale conversion is performed on the input image.

Figure 12:
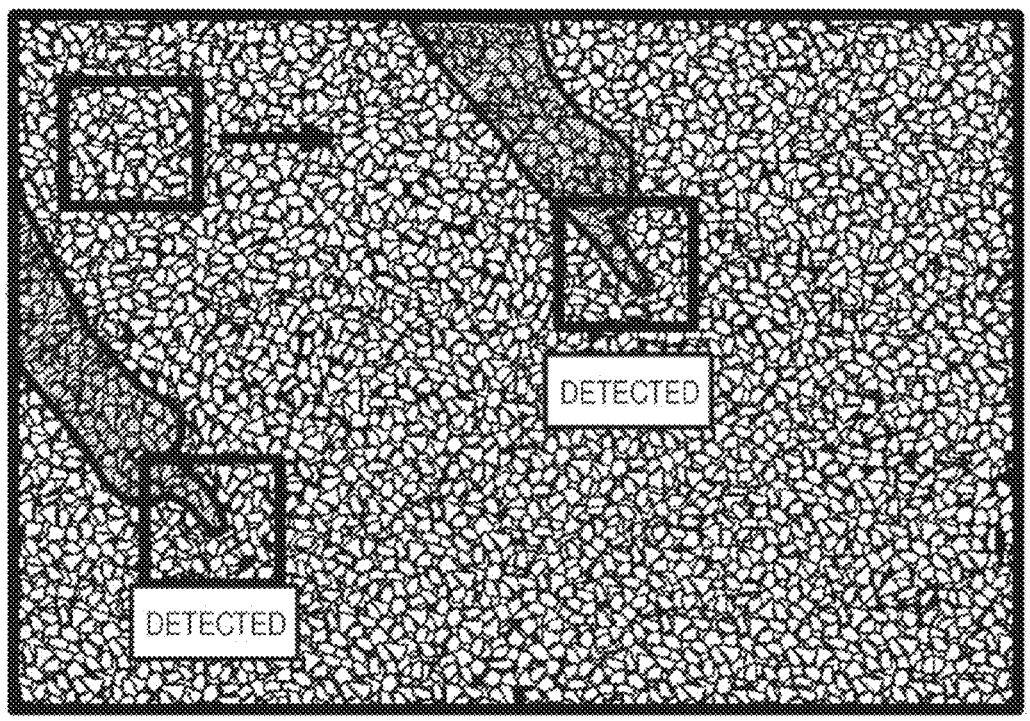
FIG. 12 is a diagram for describing the feature amount extraction process.

An example of the image scanning process is illustrated in FIG. 12.

The score corresponding to each pixel point is calculated by performing a scanning process sequentially in the horizontal, direction from the upper right of the image, calculating the feature amount (x) based on the individual selected filter at each pixel point, and then adding the feature amounts (x) calculated based on the selected filters.

When the calculated score exceeds a predefined threshold value, the target object (finger) is determined to be detected.

As illustrated in FIG. 12, the score is calculated as the score corresponding to each pixel position. However, for example, even when the score is high at only one pixel position, the target object (finger) may not be said to be detected in the image. That is, for example, when the plurality of high scores corresponding to the plurality of pixel positions according to the shape of the finger are not detected, the target object (finger) may not be said to be detected in the image.

Accordingly, in order to finally determine whether the finger is detected, it is necessary to evaluate the total scores of the plurality of pixel positions.

The specific object recognition unit 123 performs a total score evaluation process.

An example of the total score evaluation process will be described with reference to FIG. 13.

FIG. 13 illustrates images indication the filter application process at the pixel positions (pixel position 1 to k) set through the scanning process for the integral image and scores 1 to k calculated at the pixel positions calculated at the pixel positions.

When the finger is detected, the scores increase at these pixel positions.

A total score which is a total evaluation value serving as a final index value used to determine whether the target object (finger) included in the image is calculated as an added value of the scores at these pixel positions, i.e., $$\text{the total score} = \text{score } 1 + \text{score } 2 + \ldots + \text{score } k.$$

When the value obtained by adding the scores corresponding to the pixels of the image is assumed to be the total score and the total score is equal to or greater than a preset threshold value, the target object (finger) is determined to be detected.

4. Process of Determining Position of Specific Object

Next, the specific object position determination process, which is another process performed by the recognition processing unit 120, specifically, a process of determining whether the finger 30 illustrated in FIGS. 1A and 1B comes into contact with the board 21, will be described.

4-1. Process Performed by Learning Processing Unit

Even when the process of determining whether the finger 30 comes into contact with the board 21 is performed, the learning processing unit 110 of the information processing device 100 illustrated in FIG. 3 generates the recognition dictionaries using the plurality of learning images. The flow of this process is the process described above.

A learning target image to be subjected to the learning process is assumed to be a connected image obtained by connecting the L image which is an image photographed by the camera L11 and the R image which is an image photographed by the camera R12, as illustrated in FIGS. 1A and 1B.

The filter (weak learner) used to calculate the feature amount is assumed to be the separated filter illustrated in FIG. 5B.

Figure 14A:
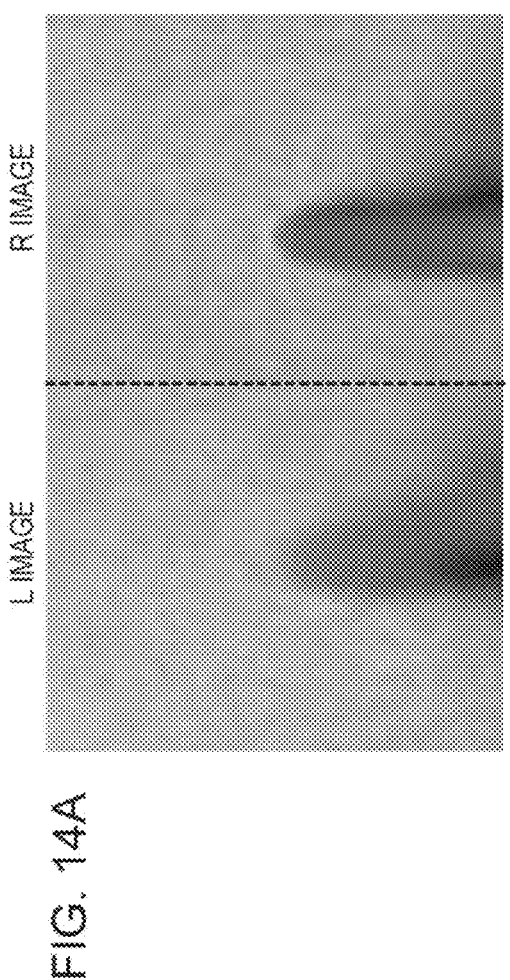
FIGS. 14A and 14B are diagrams for describing images and filters applied to a specific object position determination process.
Figure 14B:
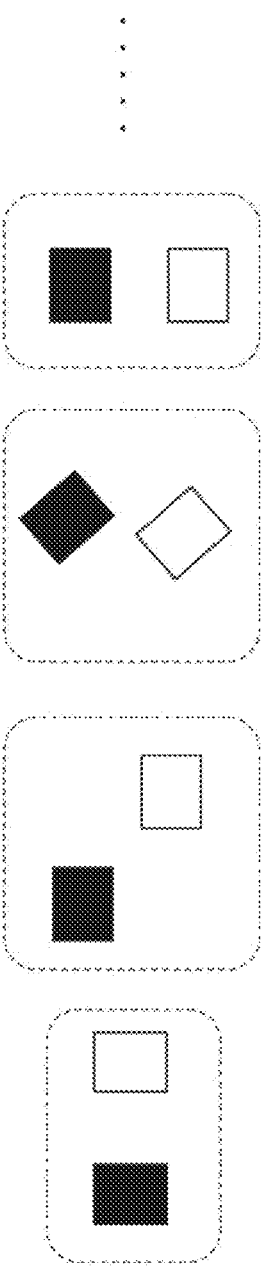

Examples of processing target images and examples of the filters are illustrated in FIGS. 14A and 14B.

FIG. 14A illustrates the processing target images, which become an image obtained by connecting the L image which is the image photographed by the camera Ell and the R image which is the image photographed by the camera R12, as illustrated in FIGS. 1A and 1B.

In the learning process to which the learning image in the learning processing unit 110 is applied and in the recognition process in which the analysis target image is input, to the recognition processing unit 120, an LR-connected image illustrated in FIG. 14A is used.

FIG. 14B illustrates the examples of the filters applied to calculation of the feature amount (x). The filters are the separated filters described above with reference to FIG. 5B and are the filters in which a white region and a black region are set to be separated.

The drawing illustrates only the filters corresponding to a first differential form in which one white region and one black region are set. However, the filters of a second different form in which two white regions and one black region are set or the filters of a third differential form in which two white regions and two black regions are set may be used.

In both of the learning process to which the learning image is applied and the recognition process in which the analysis target image is input, the separated filter is applied.

In the learning process, the plurality of LR-connected images are generated as the images of the following two categories and the learning process is performed:

(a) the image in which the finger comes into contact with the board; and (b) the image in which the finger does not come into contact with the board.

At the time of the learning process, the feature amount extraction unit 112 of the learning processing unit 110 generates the LR connected image illustrated in FIG. 14A. However, at this time, a process of cutting out and connecting only image regions containing the finger to generate the connected image may be performed.

The purpose of the learning process performed by the learning processing unit 110 is to determine parameters used in the feature amount calculation expression of the filters by selecting the filter appropriate for discriminating whether the finger comes into contact with the board. In order to efficiently perform such a process, the image regions are cut out and connected.

The parameters determined in the learning process are the following parameters an, bn, and then of the following feature amount calculation expression of each filter (weak learner) described above:

$$fn(x)=an \times g(x>thn)+bn.$$

Examples of the generation of the LR-connected image and the image cutout process will be described with reference to FIGS. 15A to 15B.

Figure 15B:
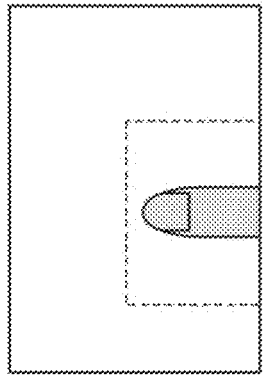
FIGS. 15A to 15C are diagrams for describing an image cutout process and a process of generating an LR-connected image.
Figure 15A:
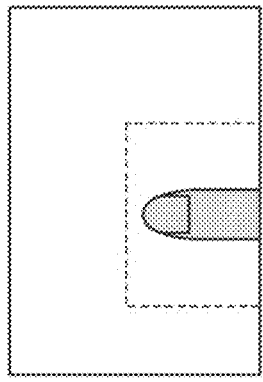

FIGS. 15A to 15B illustrate examples of the following images:

(1) an L photographed image which is an image photographed by the camera L illustrated in FIGS. 1A and 1B;

(2) an R photographed image which is an image photographed by the camera R illustrated in FIGS. 1A and 1B; and (3) an LR-connected image to be subjected to the feature amount extraction process.

Figure 15C:
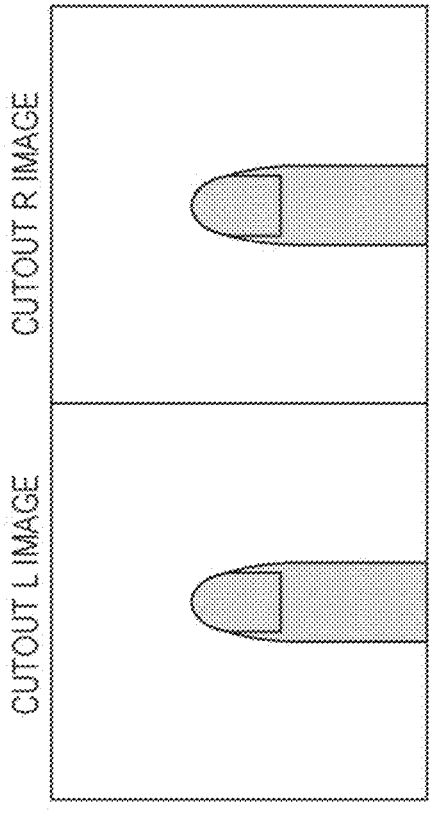

The PR-connected image illustrated in FIG. 15C is an image generated by cutting out and connecting image regions of parts of she L photographed image and the R photographed image.

As the method of the cutout process, various methods can be applied. For example, the R image is cut out such that the finger tip of the finger and the base position of the finger contained in the R photographed image are cut out and are set as the center position of the cutout image. For the P photographed image, a region corresponding to the cutout position of the R photographed image is cut out. The PR-connected image is generated by performing such a process and connecting the cutout images.

By performing the process, the filters can be evaluated and the parameters can be decided efficiently in the learning process in which it is necessary to process the plurality of PR-connected images.

Figure 16A:
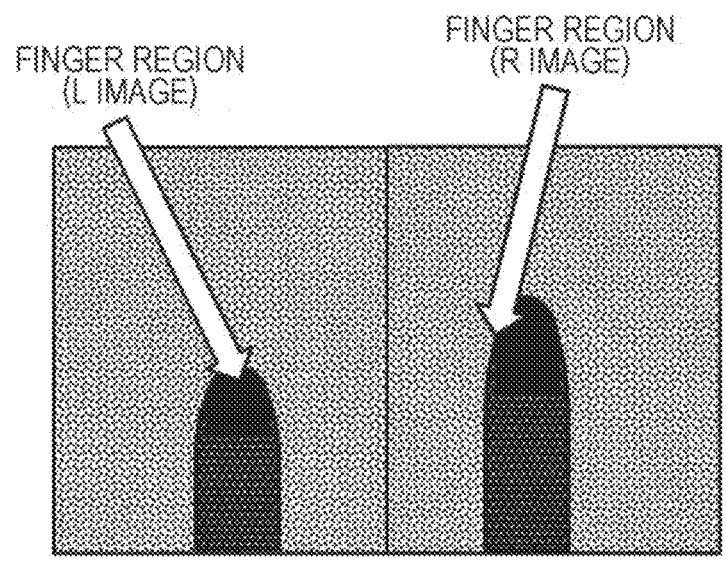
FIGS. 16A and 16B are diagrams for describing examples of the LR-connected image.
Figure 16B:
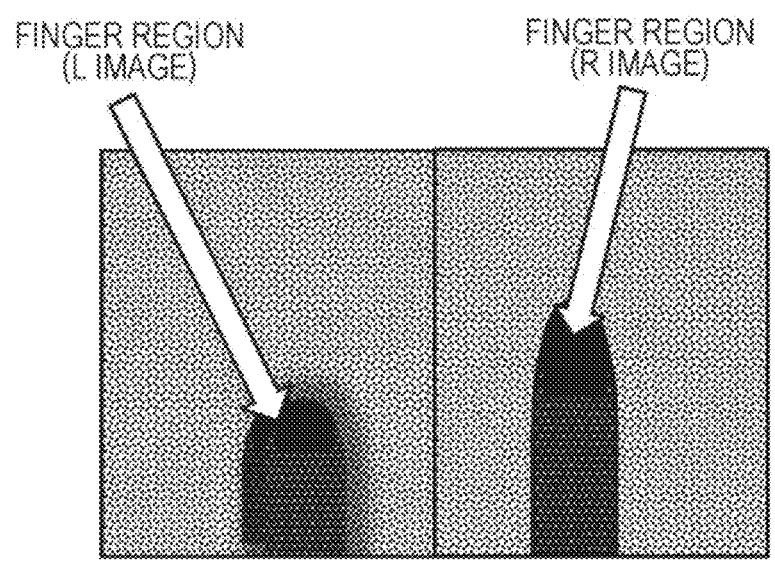

FIGS. 16A and 16B are diagrams illustrating examples of the PR-connected image generated through the image cutout process and the image connection process and used to extract the feature amount.

Examples 1 and 2 of both of the PR-connected images illustrated in FIGS. 16A and 16B are examples of schematic integral images. In the learning process, as in the analysis process, the feature amount can also be calculated by generating the integral image described above with reference to FIG. 11 and performing the scanning process on the integral image.

The feature amount extraction unit 112 of the learning processing unit 110 in FIG. 3 extracts the feature amount by performing the scanning process using such an LR-connected image. Further, the filter to be applied is the separated filter illustrated in FIG. 5B or FIG. 14B.

The machine learning unit 113 of the learning processing unit 110 in FIG. 3 inputs the feature amount calculated by the feature amount extraction unit, evaluates the filter and decide the parameters.

In the learning process, the plurality of LR-connected images are generated as the images of the following two categories and the learning process is performed:

(a) the image in which the finger comes into contact with the board; and (b) the image in which the finger does not come into contact with the board.

A process of selecting the weak learner with high discrimination is performed by inputting the images classed into the two kinds of categories, outputting the determination result to which the separated filter illustrated in FIG. 5B or 14B is applied, and performing statistical learning based on the output result.

This process will be described with reference to FIG. 17.

Figure 17:
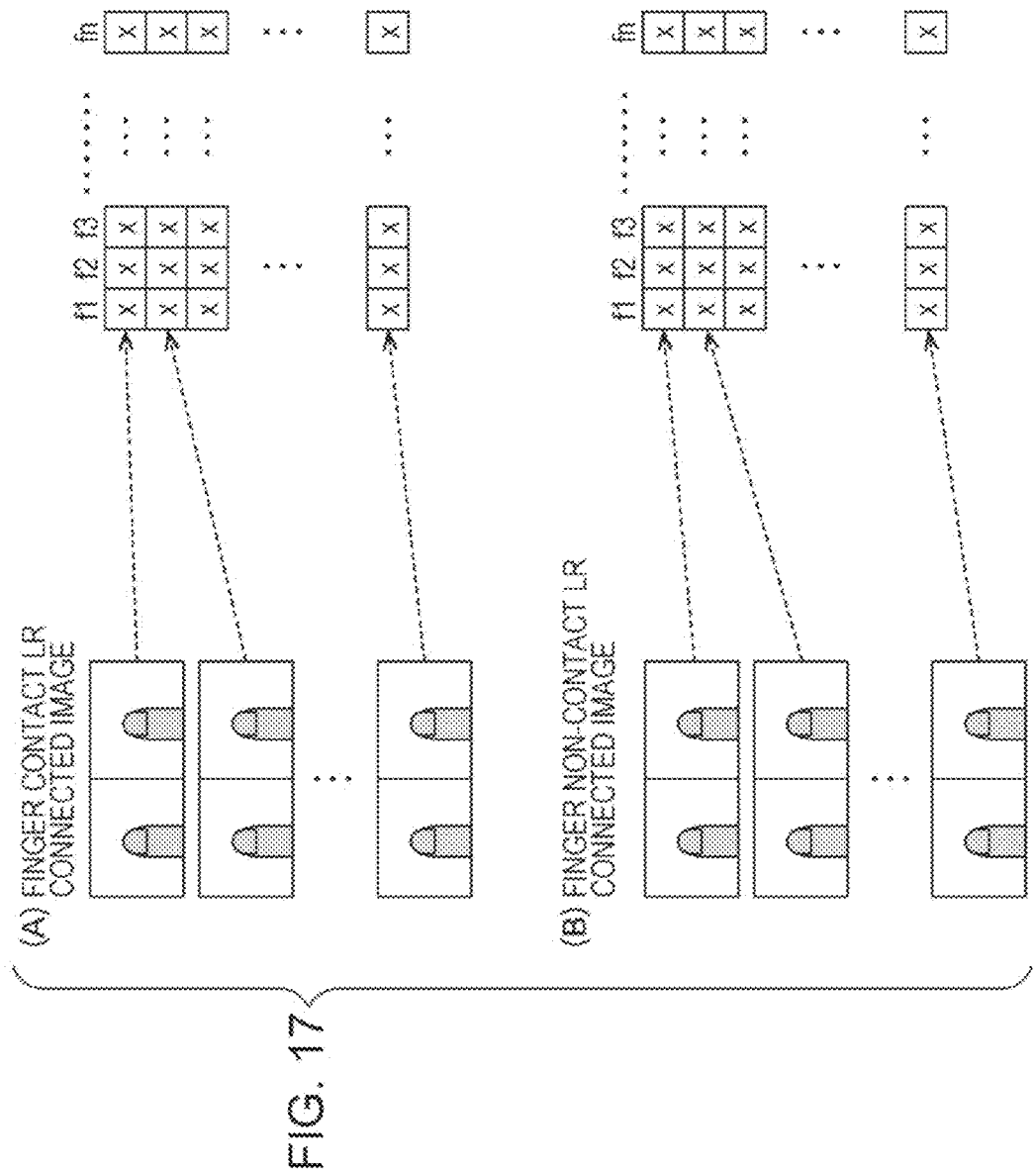
FIG. 17 is a diagram for describing a learning process for object position determination.

FIG. 17 illustrates the following images as the examples of the learning images:

Part W a "finger contact LR-connected image" which is an image in which the finger comes into contact with the board; and Part (B) a "finger non-contact LP-connected image" which is an image in which the finger does not come into contact with the board.

These learning images are images in which attribute information (a label, a tag, or the like) indicating which image is present between the foregoing (A) and (B) is set.

For each of these images, the feature amount (x) obtained by applying, the separated filters f1 to fn(=the weak learners 1 to n) described with reference to FIG. 5B or 14B is calculated. Each single rectangle illustrated in FIG. 17 indicates the feature amount x.

The LR-connected image used as the learning image may be, for example, an average image generated by averaging a plurality of continuous photographed image frames obtained through a process of photographing a moving image.

For example, a process may be performed by performing such a process to generate the following plurality of learning images:

a first learning image which is the LR-connected image generated based on an average image of the first to twentieth frames; and a second learning image which is the LR-connected image generated based on an average image of the twenty first and fortieth frames.

The value of the feature amount x is a value that differs according to the discrimination of the filters f1 to fn(=the weak learners 1 to n). When the discrimination is high, a difference between the "finger contact LR-connected image" and the "finger non-contact LR-connected image" increases.

Figure 18:
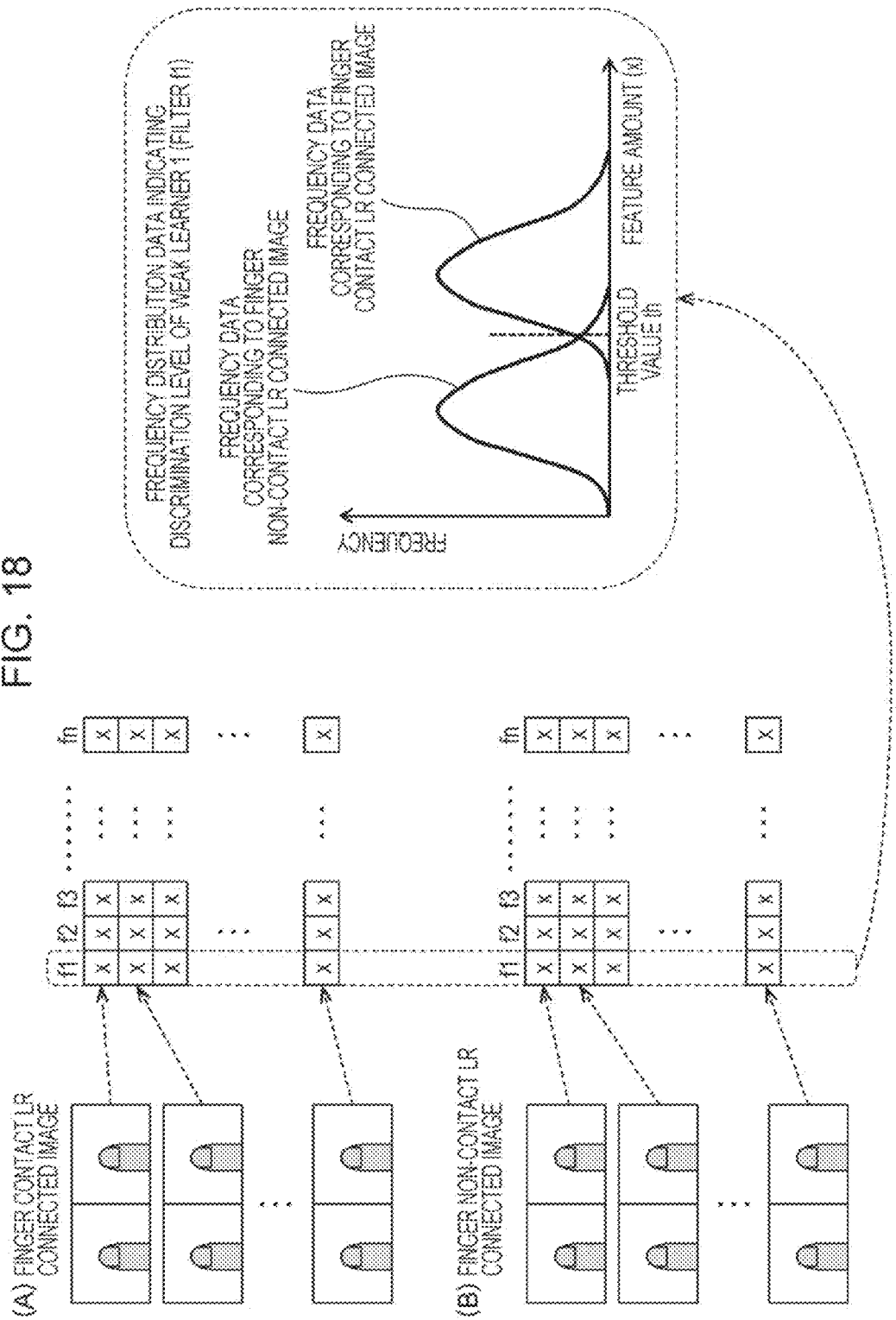
FIG. 18 is a diagram for describing the learning process for the object position determination.

FIG. 18 illustrates corresponding data of the feature amount (x) and a frequency when the filter f1 is applied to each learning image.

As shown in the frequency distribution data, when there is discrimination to some extent, different mounts are formed between a frequency distribution corresponding to the "finger contact LR-connected image" and a frequency distribution corresponding to the "finger non-contact LR-connected image."

However, the distributions become different according to the filters to be applied.

Figure 19A:
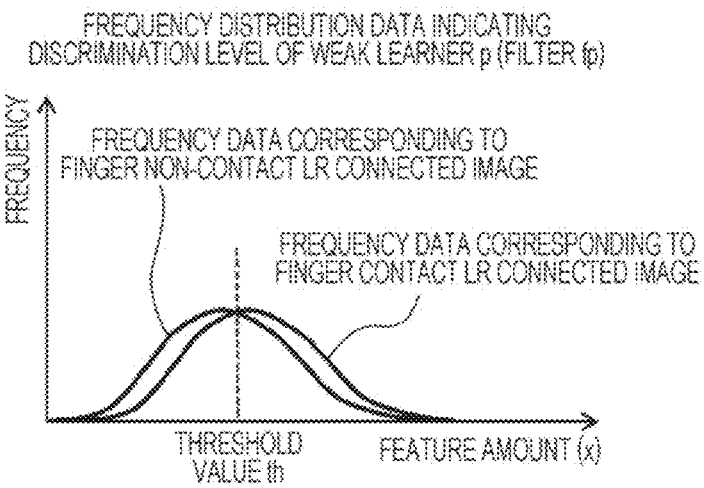
FIGS. 19A to 19C are diagrams for describing the learning process for the object position determination.

FIG. 19A illustrates an example of frequency distribution data based on a weak learner (filter) with low discrimination.

Figure 19B:
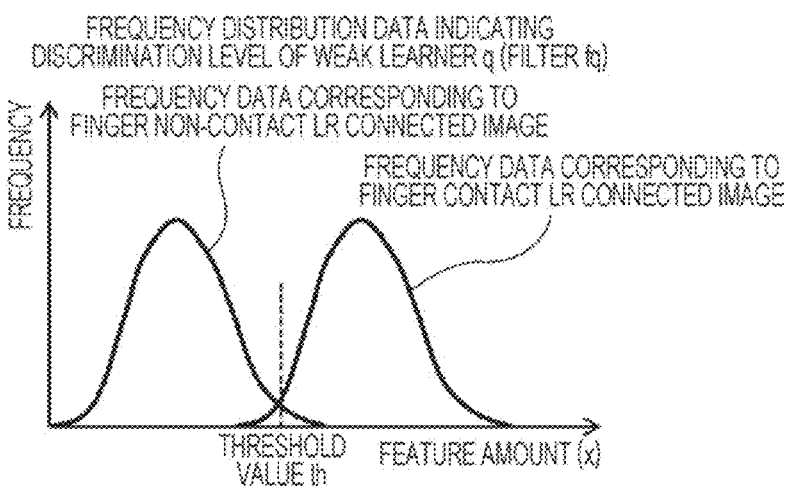

FIG. 19B illustrates an example of frequency distribution data based on the weak learner (filter) with high discrimination.

Thus, when the weak learner (filter) with low discrimination is applied, it is difficult to distinguish the "finger contact LR-connected image" from the "finger non-contact LR-connected image." When the weak learner (filter) with high discrimination is applied, it is easy to distinguish the "finger contact LR-connected image" from the "finger non-contact LR-connected image."

A discrimination process with high reliability is realized by performing the processes of selecting only the weak learners (filters) with high discrimination based on the frequency distribution data and calculating the score described with reference to FIG. 7 from only the selected filters.

Figure 19C:
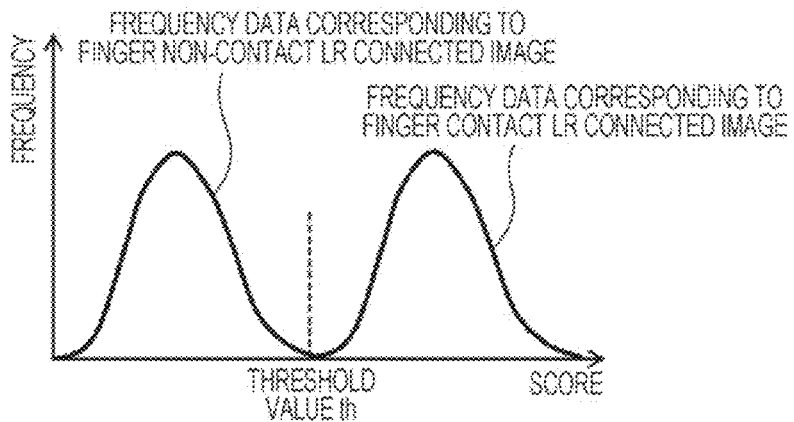

FIG. 19C illustrates an example of frequency distribution data of the score calculated from only the selected plurality of weak learners (filters) with high discrimination.

The threshold value of the score is decided by learning using, for example, a boosting or support vector and a statistical leaner such as a machine (support vector machine (SVM)).

The machine learning unit 113 performs such statistical learning to select the filters with the high discrimination and further determines the parameters.

Even for the parameters an, bn, and thn used in the function outputting the determination result by each filter (weak learner) described above with reference to FIG. 7, i.e., the following expression, an optimum value used to set a high discrimination level is calculated by the statistical learning:

$$fn(x)=an \times g(x>thn)+bn.$$

A recognition dictionary in which the parameters calculated through the learning process match data indicating the highness and lowness of the discrimination in each filter (weak learner) as filter information is generated, and then is stored in the recognition dictionary storage unit 114.

4-2. Process Performed by Recognition Processing Unit

Next, a process performed in the object position determination process (contact determination process) by the recognition processing unit 120 of then formation processing device 100 illustrated in FIG. 3 will be described.

The image input unit 121 of the recognition processing unit 120 inputs analysis target images, i.e., L and R images.

The feature amount extraction unit 122 generates the LR-connected image using the input L and R images and calculates the feature amount.

When the feature amount extraction unit 122 extracts the feature amount from the connected image generated by connecting images photographed from different viewpoints, the feature amount extraction unit 122 performs the feature amount extraction process by applying the separated filter in which filter-formed regions are set to be separated and setting the filter regions forming the separated filter in the two images of the connected image.

The specific object recognition unit 123 performs a specific object position determination process based on the feature amount extracted by the feature amount extraction unit.

The feature amount extraction unit 122 performs the feature amount extraction process to which the separated filters described with reference to FIG. 5B or FIG. 14B are applied, as in the feature amount extraction performed by the feature amount extraction unit 112 of the learning processing unit 110 described above.

However, as the filter (weak learner) to be applied to the feature amount extraction unit 122 of the recognition processing unit 120, only the filter determined to have the high discrimination according to the learning result of the learning processing unit 110 is used to perform the process.

That is, the process is performed using only the separated filter determined to have the high discrimination of the state (first state) in which the finger comes into contact with the board and the state (second state) in which the finger does not come into contact with the board.

The filters are selected based on filter information (tag) stored in the recognition dictionary storage unit 114.

The parameters an, bn, and thn in the calculation expression of the feature amount (x) by which the determination result is calculated using each filter (weak learner), i.e., the following expression are decided by the learning process of the learning processing unit 110 described above and the values stored in the recognition dictionary storage unit 114 are used:

$$fn(x)=an \times g(x>thn)+bn.$$

The recognition processing unit 120 calculates the feature amount using the selected filter determined to have the high discrimination, calculates the score, and performs the finger detection process and the process of determining whether the finger comes into contact with the board based on the value of the score.

Hereinafter, a process performed by the recognition processing unit 120 will be described with reference to the drawing.

The process performed by the recognition processing unit 120 is substantially the same process as the process described with reference to FIG. 11 and the subsequent drawings in the above description of the specific object detection process.

However, this process differs in that the processing target image is the LR-connected image and the filter to be applied is the separated filter illustrated in FIG. 5B or FIG. 14B.

The LR-connected image to be processed in the recognition process may be an LR image generated by connecting each photographed image frame photographed by each of the L and R cameras or may be an average image generated by averaging a plurality of continuous photographed image frames obtained through a process of photographing a moving image, as in the above-described learning image.

For example, the process may be performed by generating the LR-connected image generated based on an average image of the first to twentieth frames.

A process performed by the recognition processing unit 120 will be described.

The recognition processing unit 120 generates an integral image as an intermediate image from the LR-connected image in the order described above with reference to FIG. 11.

The feature amount extraction unit 122 of the recognition processing unit 120 calculates the feature amount using the integral image by applying each filter on the integral image. That is, for example, the feature amount calculation process described above with reference to FIG. 6 is performed. Specifically, the integral image is scanned and the feature amount (x) is calculated at each scanned position (x, y) by applying the above-described expressions, (Expression 1) to (Expression 2).

Here, the filter to be applied is the separated filter (weak learner) having the high discrimination level and selected in the learning process.

The score is calculated by adding the feature amounts obtained by applying the plurality of selected filters (weak learners). This process is the same as the process described above with reference to FIG. 7.

By using the integral image, rectangular characteristics can be calculated at high speed at each scanned position.

When the detection score reaches a value equal to or greater than a preset threshold value, it is detected at the scanned position (x, y) that "the finger comes into contact with the board."

Depending on the maximum detected score obtained, by scanning the image, the detection result can be negative (rejection), i.e., the result that "the finger does not come into contact with the board" can be returned in some cases. Further, the generation of the integral image and the calculation of the detected score may be configured to be repeated while changing scale conversion, i.e., the size of the input image.

When the scale conversion is performed on the initially calculated integral image, a window with any size can be searched for. However, when the scale conversion is performed on the integral image, a calculation amount increases and the advantage of speeding up the process using the integral image is cancelled. Accordingly, in the example illustrated in FIG. 11, the integral image is recalculated when the scale conversion is performed on the input image.

As in the process described above with reference to FIG. 12, the score is calculated as a score corresponding to each pixel position.

For example, even when the score increases by only one pixel position, it may not be concluded that the finger comes into contact with the board, as described above. That is, when a plurality of high scores corresponding to a plurality of pixel positions are not detected, it may not be determined that the finger in the image to comes into contact with the board.

Accordingly, in order to finally determine whether the finger comes into contact with the board, it is necessary to evaluate the scores of the plurality of pixel positions totally.

The specific object recognition unit 123 performs a total score evaluation process.

This process is the same as the total score evaluation process described above with reference to FIG. 13.

The same total score calculation process as the process described above with reference to FIG. 13 is performed. That is, a total score which is a total evaluation value serving as a final index value used to determine whether the finger in the image comes into contact with the board is calculated as an added value of the scores at these pixel positions, i.e.:

the total score=score 1+score 2+ . . . +score $k$.

When the value obtained by adding the scores corresponding to the pixels of the image is assumed to be the total score and the total score is equal to or greater than a preset threshold value, the finger is determined to come into contact with the board.

Figure 20A:
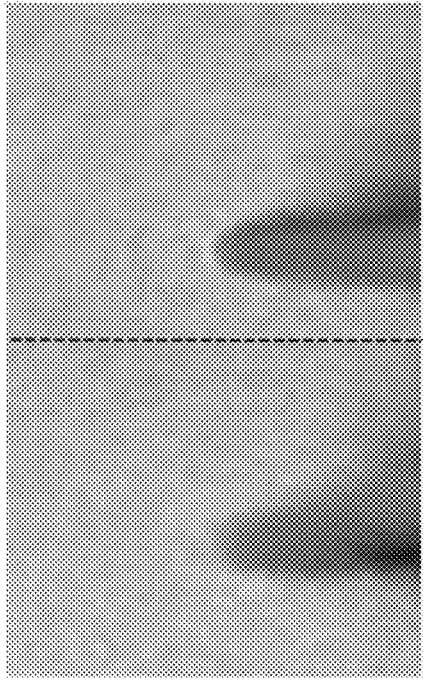
FIGS. 20A and 20B are diagrams for describing a difference between a contact image and a non-contact image in which a finger comes into contact with a board.
Figure 20B:
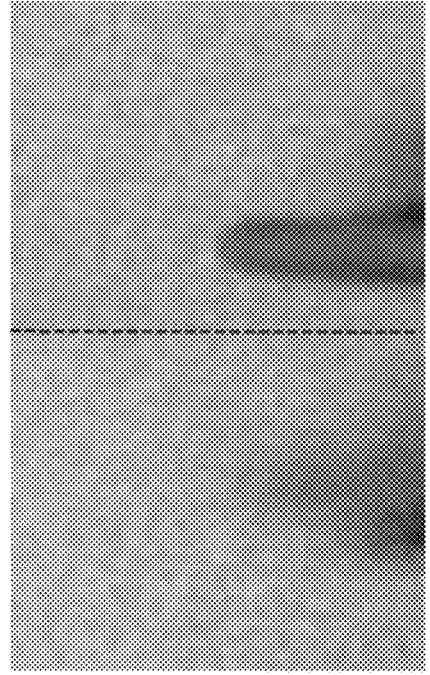

FIGS. 20A and 20B are diagrams illustrating a difference between the LR-connected image when the finger comes into contact with the board and the LR-connected image when the finger does not come into contact with the board.

FIGS. 20A and 20B illustrate the following two average Images:

(a) an average image of the LR-connected images for which the finger comes into contact with the board; and (b) an average image of the LR-connected images for which the finger does not come into contact with the board.

By setting the LR-connected image for which the position of the finger in the R image is constant as a processing target image (a learning image and an analyzed image), the LR-connected image for which the finger comes into contact with the board, as illustrated in FIG. 20A, has the following characteristics. That is, since the positions of the L and R cameras are fixed even in images photographed at different timings, the parallax is constant. Therefore, on the LR-connected image, the position of the finger is set at substantially the same position. Accordingly, in an average image of L images, the contour of the finger is relatively clearly shown.

On the other hand, in an image in which the finger does not come into contact with the board, as illustrated in FIG. 20B, the finger does not come into contact with the board. Therefore, the position of the finger in the images photographed at different timings is different for each image. As a result, the contour of the finger is blurred in the average image of the L images.

5. Embodiment in Which Filter Application Position Is Limited.

As described above, the embodiment has been described in which, as the process of determining whether the finger comes into contact with the board, the feature amount is extracted by applying the separated filter using the LR-connected image which is the connected image of the images photographed from the plurality of different viewpoints.

However, at the time of the extraction of she feature amount, it takes time to perform the filter applying process for the pixel positions of all of the images of the LR-connected image, and thus there is a probability of time taken until the output of the result being long.

As an embodiment in which such delay is prevented and a high-speed process can be performed, an embodiment in which a filter applied position is limited will be described.

This embodiment will be described with reference to FIGS. 21A to 21C.

The embodiment is an embodiment in which a filter applied position is limited to an epipolar line set in the LR-connected image.

The epipolar line is a line that is set as a search line of the same object position in two images from different viewpoints and is a line that is used for measurement of a subject distance or the like.

Figure 21A:
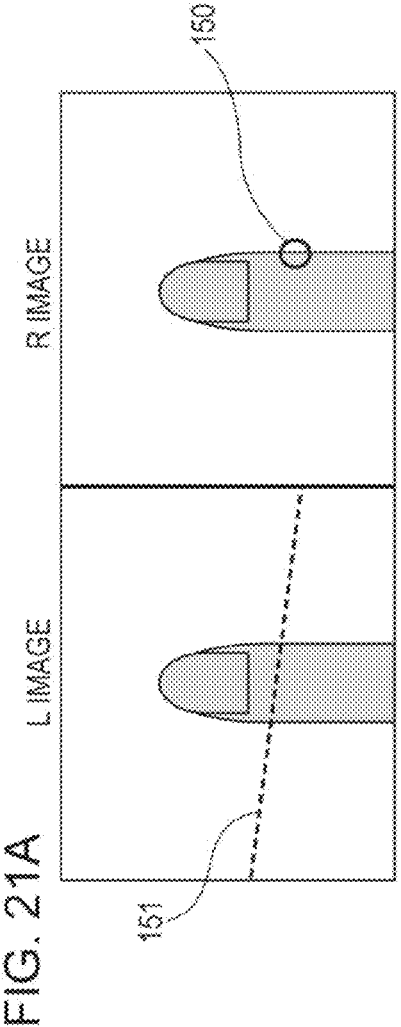
FIGS. 21A to 21C are diagrams for describing limitation of a filter application region to which an epipolar line is applied.

For example, when an R image illustrated in FIG. 21A is assumed to be a criterion image, points which are on an L image and correspond to certain points (feature points 150) on the R image are limited to an epipolar line 151 set in the L image. This is called epipolar constraint.

In the embodiment, when one filter region of the separated filter is set at the certain feature points of the R image in the LR-connected image, another filter region of the separated filter is set on the epipolar line corresponding to the feature point set in the L image.

In this way, the filter applied position is limited only to the epipolar line so that the filter applying process is performed.

Specifically, for example, a point determined to be the feature point of an edge region or the like from an R image portion of the LR-connected image is selected and the epipolar line corresponding to the feature point is set on the L image. Next, one filter region of the separated filter is set in the feature point of the R image and another filter region is set on the epipolar line on the L image.

The feature amount is calculated by performing such setting and performing the filter applying process. Further, the feature amount at each pixel position may be calculated by sliding the filter on the epipolar line on the IL image.

The pixel region on which the filter applying process is performed can be limited by performing such a process, and thus a processing amount can be reduced and the high speed process can be realized.

Figure 21C:
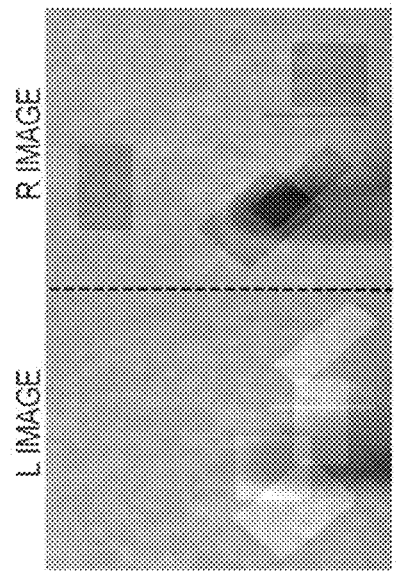
Figure 21B:
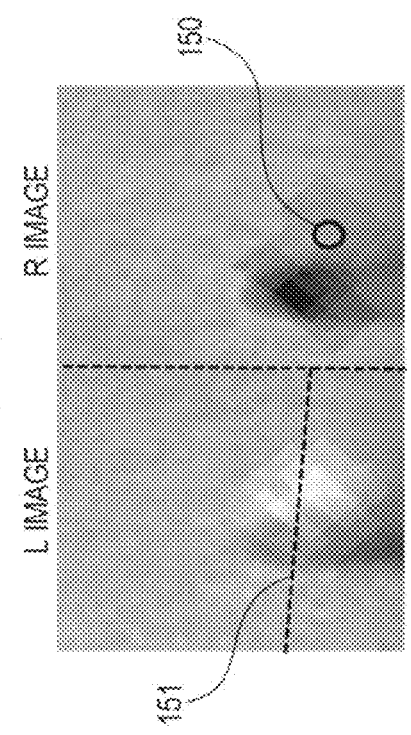

FIG. 21B illustrates an example in which the filter applying process to which the epipolar constraint is applied is performed.

On the other hand, FIG. 21C illustrates an example in which the filter applying process is performed without application of the epipolar constraint.

In the example of FIG. 21C, the filter applying process is performed on the region of all of the pixels of the entire LR-connected image to calculate the feature amount corresponding to all of the pixels. However, the effective feature amount is estimated not to be obtained from most of the region.

Conversely, in the example of FIG. 21B, the filter applying process is performed within the range limited by the epipolar line on which the corresponding points of the R and L images are detected. Therefore, the processing time can be shortened and only the effective feature amounts can be selectively extracted.

6. Characteristics and Type of Separated Filter

As described in the above embodiment, in the process of determining whether the finger comes into contact with the board, the feature amount is extracted using the LR-connected image which is the connected image of the images photographed from the plurality of different viewpoints by applying the separated filter described above in FIG. 5B or FIG. 14B.

Various filters can be used as the separated filter applied to the process of determining whether the finger comes into contact with the board.

The meanings of the feature amounts extracted from the images, i.e., the extracted image characteristics, are different due to the forms of the filters.

FIG. 22 illustrates a summary table of configuration examples of the separated filters and main image characteristics reflected to the feature amount data extracted by the separated filters.

(1) A filter I is a separated filter in which filter regions with black and white patterns and a substantially square shape inclined at 45° are separated.

Feature amount data obtained through the filter applying process is a feature amount to which parallax information is mainly reflected.

(2) A filter is a separated filter in which filter regions with black and white patterns and a rectangular shape inclined at 45° are separated.

Feature amount data obtained through the filter applying process is a feature amount to which an object shape is mainly reflected.

(3) A filter 3 is a separated filter in which filter regions with black and white patterns and a rectangular shape inclined at 0° are separated.

Feature amount data obtained through the filter applying process is a feature amount to which parallax information is mainly reflected.

(4) A filter 4 is a separated filter in which filter regions with black and white patterns and a rectangular shape having a narrow width and inclined at 0° are separated.

Feature amount data obtained through the filter applying process is a feature amount to which an object shape is mainly reflected.

(5) A filter 5 is a separated filter in which filter regions with black and white patterns and a small square shape inclined substantially at 45° are separated.

Feature amount data obtained through the filter applying process is a feature amount to which an object shape is mainly reflected.

The separated filters illustrated in FIG. 22 are examples of applicable filters and filters with other various patterns can be applied.

7. Example of Configuration of Information Processing Device

Figure 23:
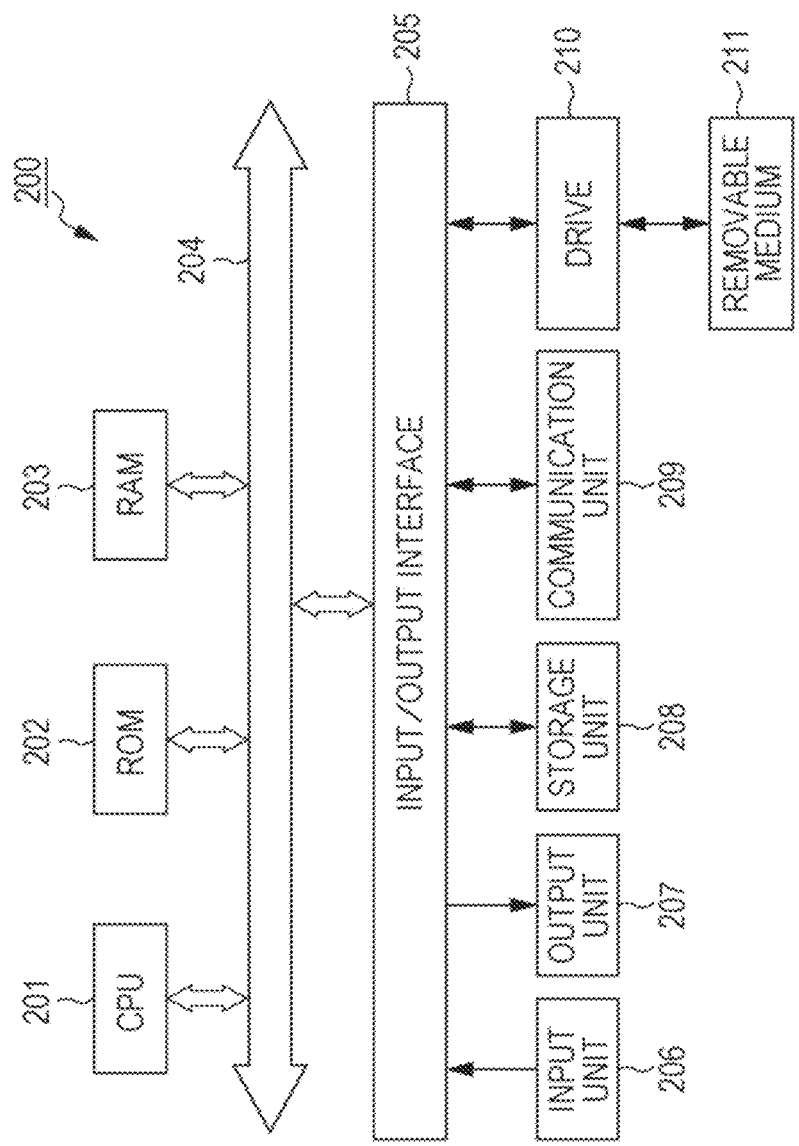
FIG. 23 is a diagram for describing an example of the configuration of an information processing device.

Next, an example of a hardware configuration of the information processing device 200 performing the above-described process will be described with reference to FIG. 23.

A central processing unit (CPU) 201 functions as a data processing unit that performs various processes according to a program stored in a read-only memory (ROM) 202 or a storage unit 208. For example, the CPU performs processes or the like according to the above-described embodiment.

A random access memory (RAM) 203 appropriately stores, for example, data or a program executed by the CPU 201. The CPU 201, the ROM 202, and the RAM 203 are mutually connected by a bus 204.

The CPU 201 is connected to an input/output interface 205 via the bus 204, and an input unit 206 including various switches, a keyboard, a mouse, or a microphone and an output unit 207 including a display or a speaker are connected to the input/output interface 205. The CPU 201 performs various processes in response to instructions input from the input unit 206 and outputs processing results to, for example, the output unit 207.

The storage unit 208 connected to the input/output interface 205 includes, for example, a hard disk and stores various kinds of data or a program executed by the CPU 201. The communication unit 209 communicates with an external device via a network such as the Internet or a local area network.

A drive 210 connected to the input/output interface 205 drives a removable medium 211 on which data is recorded or reproduced to record or reproduce data.

For example, a program executed by the CPU 201 can be recorded on the removable medium 211 serving as a package medium for supply.

8. Conclusion of Configuration According to Embodiment of the Present Disclosure The embodiments of the present disclosure have been described above in detail as the specific embodiments. However, it should be apparent to those skilled in the art that the embodiments can be corrected or substituted within the scope of the present disclosure without departing from the gist of the present disclosure. That is, since the present disclosure has been disclosed as exemplary forms, the present disclosure has non to be construed as limiting. In order to determine against of the present disclosure, the claims have to be referred to.

The technology disclosed in the present specification can be configured as follows.

(1) An information processing device includes: a feature amount extraction unit configured to extract each feature amount from a connected image generated by connecting images photographed from different viewpoints; and a specific object recognition unit configured to perform a process of determining a position of a specific object based on the feature amount extracted by the feature amount extraction unit. The feature amount extraction unit performs a feature amount extraction process to which a separated filter in which filter-formed regions are set to be separated is applied.

(2) In the information processing device described in (1), the feature amount extraction unit may perform the feature amount extraction process by setting the separated filter regions forming the separated filter in two images of the connected image.

(3) In the information processing device described in (1) or (2), the feature amount extraction unit may extract the feature amount by selectively applying filters determined to have high discrimination in first and second states of the specific object in a learning process performed in advance.

(4) The information processing device described in any one of (1) to (3) may further include a learning processing unit configured to perform a process of determining the filter with high discrimination by inputting a plurality of connected images indicating the first and second states of the specific object and extracting the feature amounts to which separated filters with different formats are applied.

(5) In the information processing device described in any one of (1) to (4), the specific object recognition unit may calculate a score by adding the feature amounts corresponding to the different separated filters and extracted by the feature amount extraction unit and perform the process of determining the position of the specific object based on the added score.

(6) In the information processing device described in any one of (1) to (5), the specific object recognition unit may calculate scores corresponding to pixels and obtained by adding the feature amounts corresponding to the pixels corresponding to the different separated filters and extracted by the feature amount extraction unit and perform the process of determining the position of the specific object based on a total score obtained by further adding the calculated scores corresponding to the pixels.

(7) In she information processing device described in any one of (1) to (6), the feature amount extraction unit may calculate the feature amount as an index value used to distinguish a first state in which a finger, which is the specific object, comes into contact with a board from a second state in which the finger does not come into contact with the board. Based on the feature amount extracted by the feature amount extraction unit, the specific object recognition unit may perform a process of determining whether the finger which is the specific object comes into contact with the board.

(8) In the information processing device described in any one of (1) to (7), the feature amount extraction unit may further extract the feature amount as the index value used to determine whether the specific object is present in an image. Based on the feature amount extracted by the feature amount extraction unit, the specific object recognition unit may perform a specific object detection process of determining whether the specific object is present or absent.

(9) In the information processing device described in any one of (1) to (8), the separated filter may be a filter in which filter regions with different luminance are set to be separated.

(10) In the information processing device described in any one of (1) to (9), the feature amount extraction unit may extract the feature amount by setting the separated filter on an epipolar line corresponding to a feature point of one image of the connected image and the feature point on the other image of the connected image.

(11) An information processing method is performed in an information processing device. The method includes: extracting, by a feature amount extraction unit, a feature amount from a connected image generated by connecting images photographed from different viewpoints; and performing, by a specific object recognition unit, a process of determining a position of a specific object based on the feature amount extracted by the feature amount extraction unit. The feature amount extraction unit performs a feature amount extraction process to which a separated filter in which filter-formed regions are set to be separated is applied.

(12) A program causes an information processing device to perform information processing. The program causes: a feature amount extraction unit to extract a feature amount from a connected image generated by connecting images photographed from different viewpoints; a specific object recognition unit to perform a process of determining a position of a specific object based on the feature amount extracted by the feature amount extraction unit; and the feature amount extraction unit to perform a feature amount extraction process to which a separated filter in which filter-formed regions are set to be separated is applied.

The series of processes described in the present specification can be executed by hardware, software, or a combination configuration of both the hardware and the software. When the processes are executed by software, a program recording a process sequence can be installed and executed in a memory in a computer embedded in dedicated hardware or a program can be installed and executed in a general computer capable of executing various processes. For example, the program can be recorded in advance in a recording medium. The program can be installed in a computer from a recording medium and the program can also be received via a network such as a local area network (LAN) or the Internet and can be installed in a recording medium such as an internal hard disk.

The various processes described in the present specification may be performed chronologically according to the description and may also be performed in parallel or individually according to the processing capability of a device performing the processes or as necessary. A system in the present specification refers to a logical collection of a plurality of devices and is not limited to a configuration in which constituent devices are present in the same casing.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
a feature amount extraction unit configured to extract each feature amount from a connected image generated by connecting images photographed from different viewpoints; and
a specific object recognition unit configured to perform a process of determining a position of a specific object based on the feature amount extracted by the feature amount extraction unit,
wherein the feature amount extraction unit performs a feature amount extraction process to which a separated filter in which filter-formed regions are set to be separated is applied,
wherein the feature amount extraction unit calculates the feature amount as an index value used to distinguish a first state in which a finger, which is the specific object, comes into contact with a board from a second state in which the finger does not come into contact with the board,
wherein based on the feature amount extracted by the feature amount extraction unit, the specific object recognition unit performs a process of determining whether the finger which is the specific object comes into contact with the board, and
wherein the feature amount extraction unit and the specific object recognition unit are each implemented via at least one processor.

2. The information processing device according to claim 1, wherein the feature amount extraction unit performs the feature amount extraction process by setting the separated filter regions forming the separated filter in two images of the connected image.

3. The information processing device according to claim 1, wherein the feature amount extraction unit extracts the feature amount by selectively applying filters determined to have high discrimination in first and second states of the specific object in a learning process performed in advance.

4. The information processing device according to claim 1, further comprising:
a learning processing unit configured to perform a process of determining the filter with high discrimination by inputting a plurality of connected images indicating the first and second states of the specific object and extracting the feature amounts to which separated filters with different formats are applied.

5. The information processing device according to claim 1, wherein the specific object recognition unit calculates a score by adding the feature amounts corresponding to the different separated filters and extracted by the feature amount extraction unit and performs the process of determining the position of the specific object based on the added score.

6. The information processing device according to claim 1, wherein the specific object recognition unit calculates scores corresponding to pixels and obtained by adding the feature amounts corresponding to the pixels corresponding to the different separated filters and extracted by the feature amount extraction unit and performs the process of determining the position of the specific object based on a total score obtained by further adding the calculated scores corresponding to the pixels.

7. The information processing device according to claim 1,
wherein the feature amount extraction unit further extracts the feature amount as the index value used to determine whether the specific object is present in an image, and
wherein based on the feature amount extracted by the feature amount extraction unit, the specific object recognition unit performs a specific object detection process of determining whether the specific object is present or absent.

8. The information processing device according to claim 1, wherein the separated filter is a filter in which filter regions with different luminance are set to be separated.

9. The information processing device according to claim 1, wherein the feature amount extraction unit extracts the feature amount by setting the separated filter on an epipolar line corresponding to a feature point of one image of the connected image and the feature point on the other image of the connected image.

10. An information processing method performed in an information processing device, the method comprising:
extracting, by a feature amount extraction unit, a feature amount from a connected image generated by connecting images photographed from different viewpoints; and
performing, by a specific object recognition unit, a process of determining a position of a specific object based on the feature amount extracted by the feature amount extraction unit,
wherein the feature amount extraction unit performs a feature amount extraction process to which a separated filter in which filter-fanned regions are set to be separated is applied,
wherein the feature amount extraction unit calculates the feature amount as an index value used to distinguish a first state in which a finger, which is the specific object, comes into contact with a board from a second state in which the finger does not come into contact with the board, and
wherein based on the feature amount extracted by the feature amount extraction unit, the specific object recognition unit performs a process of determining whether the finger which is the specific object comes into contact with the board.

11. A non-transitory computer-readable medium having embodied thereon a program, which when executed by a computer causes the computer to execute a method, the method comprising:
extracting a feature amount from a connected image generated by connecting images photographed from different viewpoints;
performing a process of determining a position of a specific object based on the extracted feature amount;
performing a feature amount extraction process to which a separated filter in which filter-formed regions are set to be separated is applied;
calculating the feature amount as an index value used to distinguish a first state in which a finger, which is the specific object, comes into contact with a board from a second state in which the finger does not come into contact with the board; and
performing a process of determining whether the finger which is the specific object comes into contact with the board based on the extracted feature amount.

12. An information processing device comprising:
- a feature amount extraction unit configured to extract each feature amount from a connected image generated by connecting images photographed from different viewpoints; and
- a specific object recognition unit configured to perform a process of determining a position of a specific object based on the feature amount extracted by the feature amount extraction unit,
- wherein the feature amount extraction unit performs a feature amount extraction process to which a separated filter in which filter-formed regions are set to be separated is applied,
- wherein the specific object recognition unit calculates a score by adding the feature amounts corresponding to the different separated filters and extracted by the feature amount extraction unit and performs the process of determining the position of the specific object based on the added score, and
- wherein the feature amount extraction unit and the specific object recognition unit are each implemented via at least one processor.

13. An information processing device comprising:
- a feature amount extraction unit configured to extract each feature amount from a connected image generated by connecting images photographed from different viewpoints; and
- a specific object recognition unit configured to perform a process of determining a position of a specific object based on the feature amount extracted by the feature amount extraction unit,
- wherein the feature amount extraction unit performs a feature amount extraction process to which a separated filter in which filter-formed regions are set to be separated is applied,
- wherein the feature amount extraction unit performs a feature amount extraction process to which a separated filter in which filter-formed regions are set to be separated is applied,
- wherein the specific object recognition unit calculates scores corresponding to pixels and obtained by adding the feature amounts corresponding to the pixels corresponding to the different separated filters and extracted by the feature amount extraction unit and performs the process of determining the position of the specific object based on a total score obtained by further adding the calculated scores corresponding to the pixels, and
- wherein the feature amount extraction unit and the specific object recognition unit are each implemented via at least one processor.

* * * * *